United States Patent
Badola

(10) Patent No.: US 11,663,087 B2
(45) Date of Patent: May 30, 2023

(54) VALIDATING METERING OF A DISASTER RECOVERY SERVICE USED IN CLOUDS

(71) Applicant: Nutanix, Inc., San Jose, CA (US)

(72) Inventor: Manoj Badola, Bangalore (IN)

(73) Assignee: NUTANIX, INC., San Jose, CA (US)

( * ) Notice: Subject to any disclaimer, the term of this patent is extended or adjusted under 35 U.S.C. 154(b) by 68 days.

(21) Appl. No.: 17/248,944

(22) Filed: Feb. 15, 2021

(65) Prior Publication Data

US 2021/0255931 A1    Aug. 19, 2021

(30) Foreign Application Priority Data

Feb. 19, 2020 (IN) .............. 202041007046

(51) Int. Cl.
*G06F 11/14* (2006.01)
*G06F 9/50* (2006.01)
*G06F 11/30* (2006.01)

(52) U.S. Cl.
CPC ........ *G06F 11/1456* (2013.01); *G06F 9/5072* (2013.01); *G06F 9/5077* (2013.01); *G06F 11/1448* (2013.01); *G06F 11/3051* (2013.01); *G06F 2209/508* (2013.01)

(58) Field of Classification Search
CPC ............. G06F 11/1456; G06F 11/1448; G06F 11/1461; G06F 11/3051; G06F 2009/508
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,874,732 B1 * | 10/2014 | Sukumaran | H04L 43/50 709/200 |
| 9,268,799 B1 | 2/2016 | Qi et al. | |
| 9,477,555 B1 | 10/2016 | Hagan et al. | |
| 9,772,866 B1 | 9/2017 | Aron et al. | |
| 10,524,028 B1 * | 12/2019 | Badola | H04L 67/10 |
| 11,455,220 B2 * | 9/2022 | Shpilyuck | G06F 11/203 |

(Continued)

OTHER PUBLICATIONS

Wikipedia's Multicloud historical version published Feb. 15, 2020 https://en.wikipedia.org/w/index.php?title=Multicloud&oldid=940901545 (Year: 2020).*

(Continued)

*Primary Examiner* — Joseph O Schell
(74) *Attorney, Agent, or Firm* — IPHorizons PLLC; Narendra Reddy Thappeta

(57) ABSTRACT

An aspect of the present disclosure facilitates validating metering of a disaster recovery service used in clouds. In one embodiment, a system receives a request to validate metering of usage of a disaster recovery service (DRS) in a first cloud. The system collects from a metering service of the DRS, measured values representing the actual usage of the DRS in a second cloud and then compares the measured values with corresponding expected values representing expected usage of the DRS in the second cloud. The system sends a response to the request based on a result of the comparing. In one embodiment, the request is received from a tenant (customer/owner) owning the first cloud.

14 Claims, 24 Drawing Sheets

(56) References Cited

U.S. PATENT DOCUMENTS

| | | | | |
|---|---|---|---|---|
| 2005/0027571 | A1* | 2/2005 | Gamarnik | G06Q 40/08 |
| | | | | 705/4 |
| 2006/0095696 | A1* | 5/2006 | Amano | G06F 11/1471 |
| | | | | 711/162 |
| 2007/0106605 | A1* | 5/2007 | Kaplan | G06Q 20/102 |
| | | | | 705/40 |
| 2010/0192212 | A1* | 7/2010 | Raleigh | H04W 12/08 |
| | | | | 726/7 |
| 2014/0136707 | A1* | 5/2014 | Beaty | H04L 47/826 |
| | | | | 709/226 |
| 2014/0201569 | A1* | 7/2014 | Radhakrishnan | H04L 41/0654 |
| | | | | 714/20 |
| 2015/0032817 | A1* | 1/2015 | Garg | G06F 11/2048 |
| | | | | 709/204 |
| 2015/0039930 | A1* | 2/2015 | Babashetty | G06F 11/2221 |
| | | | | 714/4.11 |
| 2017/0139816 | A1* | 5/2017 | Sapozhnikov | G06F 11/3672 |
| 2018/0074887 | A1* | 3/2018 | Braham | G06F 11/076 |
| 2018/0150356 | A1* | 5/2018 | Boshev | G06F 11/2094 |
| 2020/0073764 | A1* | 3/2020 | Neichev | G06F 11/1469 |
| 2021/0034992 | A1* | 2/2021 | Mukeri | G06F 11/0757 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https:/nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https:/nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https:/nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

VMware Cloud, https://cloud.vmware.com/vcloud-usage-meter/, downloaded circa Feb. 4, 2020, 02 pages.

VMware Site Recovery, https://blogs.vmware.com/virtualblocks/2017/11/28/vmware-site-recovery-delivers-draas-for-vmware-cloud-on-aws/, Nov. 28, 2017, 07 pages.

VMware Site Recovery Manager, https://www.insight.com/content/dam/insight-web/Canada/PDF/partner/vmware/VMware-vCloud-air-network-program.pdf, downloaded circa Feb. 4, 2020, 86 pages.

Configure Permissions for Site Recovery Manager, https://docs.vmware.com/en/vCloud-Usage-Meter/3.6/com.vmware.vcum.usersguide.doc/GUID-52AF5560-1491-4EC3-AB38-A3728E429759.html, downloaded circa Feb. 4, 2020, 03 pages.

DRaaS—Disaster Recovery as a Service, https://www.greenhousedata.com/disaster-recovery-as-a-service, downloaded circa Feb. 4, 2020, 07 pages.

Microsoft Azure Site Recovery Licensing WhitePaper, https://mk0licensingschvvvb2.kinstacdn.com/wp-content/uploads/2016/04/Microsoft-Azure-Site-Recovery-Licensing-White-Paper-May-2015.pdf downloaded circa Feb. 4, 2020, 10 Pages.

Carbonite Recover, https://www.carbonite.com/products/carbonite-recover, downloaded circa Feb. 4, 2020, 08 pages.

Steve Jurczak, DRaaS ushers in changes to data protection strategy, https://www.carbonite.com/blog/article/2018/02/draas-ushers-in-changes-to-data-protection-strategy, Feb. 20, 2018, 15 pages.

Data Protection as a Service, https://www.hitachivantara.com/en-us/products/data-protection/dpaas.html?icid=as_us_en_2019067, downloaded circa Feb. 4, 2020, 05 pages.

Data Protection as a service form Hitachi Vantara, https://www.hitachivantara.com/en-us/pdfd/solution-profile/data-protection-as-a-service-solution-profile.pdf, downloaded circa Feb. 4, 2020, 05 pages.

* cited by examiner

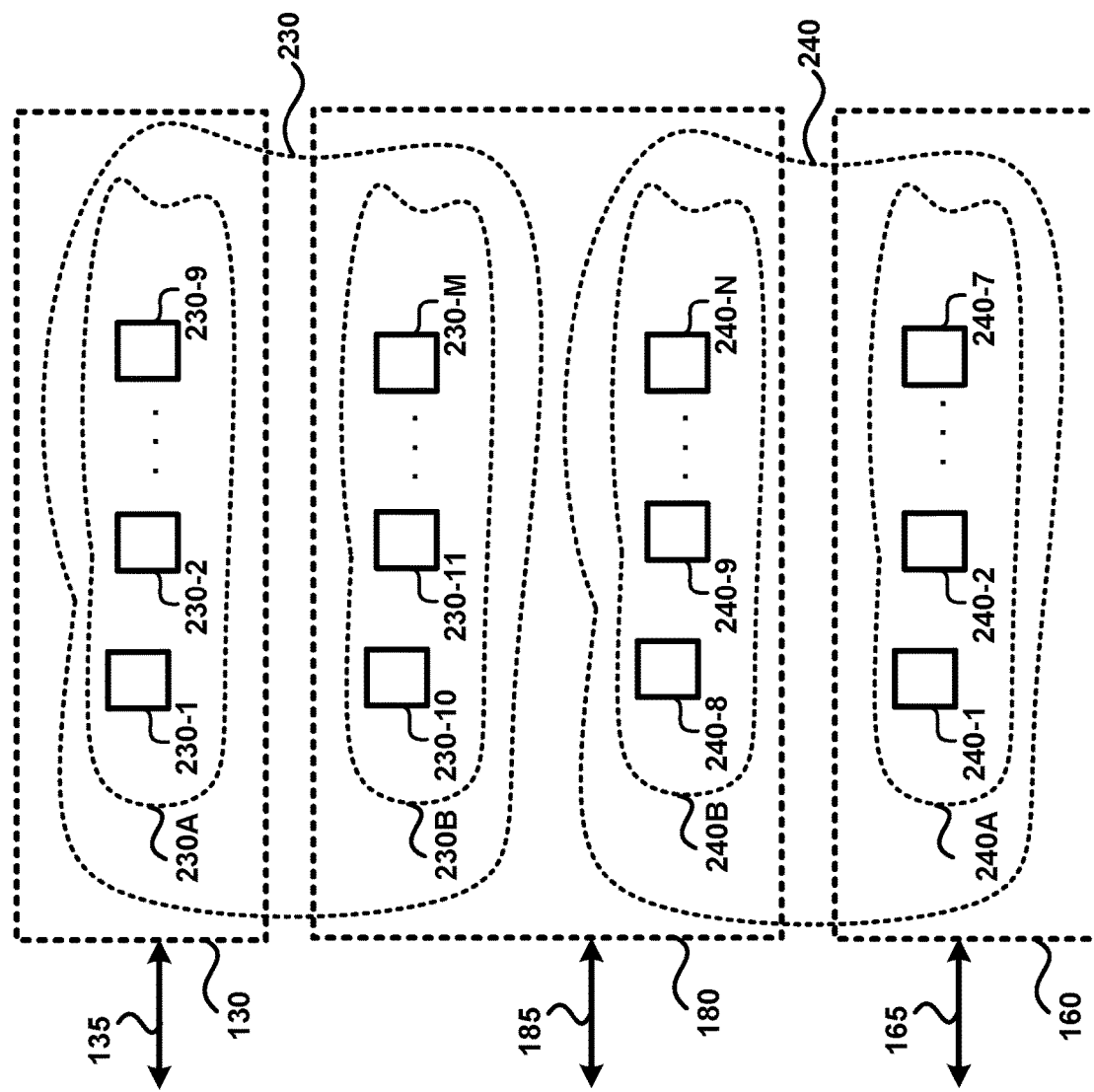
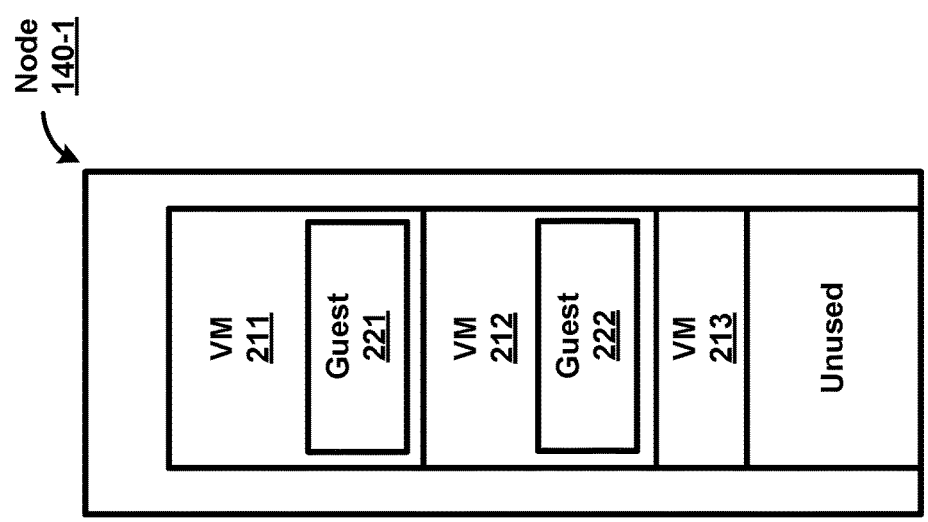

Browser

Categories — 13 Total Categories

[Actions ▼] [New Category]

Type name to filter by

1 selected out of 13 Categories      1-13 of 13  ☆

| | Name | Value | Assigned Entities | Assigned Policies | |
|---|---|---|---|---|---|
| ☐ | AppFamily SYSTEM | Backup, B1-Productivity, Cont... | 116 Catalog Items | - | Show more ▼ |
| ☐ | AppTier SYSTEM | Default | - | - | Show more ▼ |
| ☐ | AppType SYSTEM | Apache_Spark, Default, Empl... | - | - | Show more ▼ |
| ☐ | Citrix | AD, Client, Controller (2 more) | 1 VM | 1 Protection Policy, 1 Recovery Plan | Show more ▼ |
| ☐ | DR-NG-Wags | ConOps, MSSql, WEB | 3 VMs | 1 Protection Policy | Show more ▼ |
| ☐ | DRonPrem | Database, fileserver, images (1 more) | 8 VMs | 1 Protection Policy, 1 Recovery Plan | Show more ▼ |
| ☐ | DRtoXidev | database1, loadgen, SQL-FIN (2 more) | - | 1 Protection Policy, 2 Recovery Plans | Show more ▼ |
| ☐ | Environment SYSTEM | Dev, Production, Staging (1 more) | 5 VMs | 1 Protection Policy, 1 Recovery Plan | Show more ▼ |
| ☑ | Ormed | fileshare, SQL, web | 1 VM | 1 Protection Policy | Show more ▼ |
| ☐ | PartialtoBeer | LegacyAppThatMakesALLtheMoney | - | - | Show more ▼ |
| ☐ | Quarantine SYSTEM | Strict, Forensic | - | - | Show more ▼ |
| ☐ | TemplateType SYSTEM | Application, Vm | - | - | Show more ▼ |
| ☐ | VirtualNetworkType SYSTEM | Tenant, Test | - | - | Show more ▼ |

415 → (Ormed row)

Browser

Categories
13 Total Categories

400 →

| Type name to filter | Actions ∨ | New Category |

1 selected out of

Update Category 420

General

Name ?
[ Ormed ]
Category cannot be renamed as it is in use by one or more policies Purpose ?
[           ]

Values ?
SQL — (-)
fileshare — (-)
Web — (-)
  (+)

[ Cancel ] [ Save ]

1-13 of 13 < >

| | Name | | |
|---|---|---|---|
| ☐ | AppFamily SYS | | Show more > |
| ☐ | AppTier SYSTE | | Show more > |
| ☐ | AppType SYST | | Show more > |
| ☐ | Citrix | very Plan | Show more > |
| ☐ | DR-NG-Wags | | Show more > |
| ☐ | DRonPrem | VMs: 1, Protection Policies: 1, Recovery Plans: 1 | very Plan | Show more > |
| ☐ | DRtoXidev | VMs: 1, Protection Policies: 1, Recovery Plans: 1 | very Plans | Show more > |
| ☐ | Environment S | VMs: 3, Protection Policies: 1, Recovery Plans: 1 | very Plan | Show more > |
| ☑ | Ormed | | | Show more > |
| ☐ | PartialtoBeer | - | | Show more > |
| ☐ | Quarantine SYSTEM | Strict, Forensic | | Show more > |
| ☐ | TemplateType SYSTEM | Application, Vm | | Show more > |
| ☐ | VirtualNetworkType SYSTEM | Tenant, Test | | Show more > |

*FIG. 4B*

Update Protection Policy

US-EAST-1B ⇕ autoselect ⇕

Recovery Point Objective     Start Immediately  Change

460 → Hours ⇕   12 ⇕

Retention Policy ○ Linear ● Roll-up
Remote Retention

− 2 +   Days ⇕

2 hourly, 2 daily recovery points will be retained

Local Retention

− 1 +   Days ⇕

2 hourly, 1 daily recovery points will be retained

470 → Current pricing level: Advanced    View Pricing Detail

☐ Take App-Consistent Recovery Point ?

480 → Associated Categories ?

| Name   | Value     | Update |
|--------|-----------|--------|
| Ormed  | fileshare |        |
| Ormed  | Web       |        |
| Ormed  | SQL       |        |

490

Cancel   Save

500 → TE1 – Category Data

| Category | VM List | VM Total |
|---|---|---|
| Ormed | VM1 <2x, 4GB, 70GB>, VM2 <1x, 2GB, 150GB>, VM3 <4x, 8GB, 200GB> | <7x, 14GB, 420GB> |
| Tier1-Minute | VM9 <2x, 2GB, 100GB>, VM10 <2x, 2GB, 100GB> | <4x, 4GB, 200GB> |
| SQL | VM11 <3x, 4GB, 100GB> | <3x, 4GB, 100GB> |
| Tier3-Daily | VM16 <3x, 4GB, 100GB>, VM21 <2x, 2GB, 100GB> | <5x, 6GB, 200GB> |
| Citrix | VM34 <4x, 8GB, 200GB> | <4x, 8GB, 200GB> |

511 → (Ormed row)

*FIG. 5A*

550 → TE1 – Policy Data

| Policy ID | Policy Name | Category | RPO | Start Date Time | End Date Time | Metering Tier |
|---|---|---|---|---|---|---|
| P100 | ORMED | Ormed | 12 hours | 05-Nov-2020 10:40 | 28-Jan-2021 16:45 | Advanced |
| P200 | TIER1-MINUTE | Tier1-Minute | 15 minutes | 05-Nov-2020 10:42 | - | Premium |
| P300 | SQL | SQL | 1 hour | 18-Dec-2020 13:35 | 28-Jan-2021 16:45 | Premium |
| P400 | TIER3-DAILY | Tier3-Daily | 1 day | 18-Dec-2020 13:40 | - | Advanced |
| P301 | SQL | SQL | 1 day | 28-Jan-2021 16:45 | - | Advanced |
| P500 | CITRIX | Citrix | 3 hours | 28-Jan-2021 16:45 | - | Premium |

| | Date Time | Tenant | Policies Activated |
|---|---|---|---|
| 811 → | 25-Jan-2021 00:15 | TE3 | P200 |
| | 25-Jan-2021 00:30 | TE3 | P200 |
| | 25-Jan-2021 00:45 | TE3 | P200 |
| 812 → | 25-Jan-2021 01:00 | TE3 | P200, P300 |
| | 25-Jan-2021 01:15 | TE3 | P200 |
| | 25-Jan-2021 01:30 | TE3 | P200 |
| 813 → | 25-Jan-2021 01:45 | TE3 | P200, P300 |
| | 25-Jan-2021 02:00 | TE3 | P200 |
| | ... | ... | ... |
| 814 → | 25-Jan-2021 12:00 | TE3 | P200, P300, P100 |
| | ... | ... | ... |
| 815 → | 25-Jan-2021 23:45 | TE3 | P200 |
| | 25-Jan-2021 24:00 | TE3 | P200, P300, P100, P400 |
| | ... | ... | ... |
| 816A → | 27-Jan-2021 10:15 | TE3 | P200 |
| 816B → | 27-Jan-2021 11:00 | TE3 | P200, P300 |

800 ↗

| | Date Time | Tenant | Policies Activated |
|---|---|---|---|
| | ... | ... | ... |
| 817 → | 28-Jan-2021 12:00 | TE3 | P200, P300, P100 |
| | ... | ... | ... |
| 818 → | 28-Jan-2021 16:00 | TE3 | P200, P300 |
| | 28-Jan-2021 16:15 | TE3 | P200 |
| | 28-Jan-2021 16:30 | TE3 | P200 |
| 819 → | 28-Jan-2021 16:45 | TE3 | P200, P300 |
| | 28-Jan-2021 17:00 | TE3 | P200 |
| | ... | ... | ... |
| 820 → | 28-Jan-2021 17:15 | TE3 | P200, P300, P500 |
| | ... | ... | ... |
| 821 → | 28-Jan-2021 18:00 | TE3 | P200, P400, P301, P500 |
| | 28-Jan-2021 24:00 | TE3 | P200 |
| 822 → | 31-Jan-2021 23:45 | TE3 | P200 |
| 823 → | 31-Jan-2021 24:00 | TE3 | P200, P400, P301, P500 |

TE3 – Measured — 830

| Date/Policy ID (Metering Tier) | P100 (Advanced) | P200 (Premium) | P300 (Premium) | P301 (Advanced) | P400 (Advanced) | P500 (Premium) |
|---|---|---|---|---|---|---|
| ☐ 25-Jan-2021 | | | | | | |
| vcpu | 2 | 96 | 24 | 0 | 1 | 0 |
| memory | 14x | 384x | 72x | 0 | 5x | 0 |
| memory | 28GB | 384GB | 96GB | 0 | 6GB | 0 |
| storage | 840GB | 19200GB | 2400GB | 0 | 100GB | 0 |
| ☐ 26-Jan-2021 | | | | | | |
| vcpu | 2 | 96 | 24 | 0 | 1 | 0 |
| memory | 14x | 384x | 72x | 0 | 5x | 0 |
| memory | 28GB | 384GB | 96GB | 0 | 6GB | 0 |
| storage | 840GB | 19200GB | 2400GB | 0 | 100GB | 0 |
| ☐ 27-Jan-2021 | | | | | | |
| vcpu | 2 | 94 | 24 | 0 | 1 | 0 |
| memory | 14x | 376x | 72x | 0 | 5x | 0 |
| memory | 28GB | 376GB | 96GB | 0 | 6GB | 0 |
| storage | 840GB | 18800GB | 2400GB | 0 | 100GB | 0 |
| ☐ 28-Jan-2021 | | | | | | |
| vcpu | 1 | 96 | 18 | 1 | 1 | 3 |
| memory | 0 | 384x | 54x | 7x | 5x | 12x |
| memory | 0 | 384GB | 72GB | 14GB | 6GB | 24GB |
| storage | 0 | 19200GB | 1800GB | 420GB | 100GB | 600GB |
| ... | ... | ... | ... | ... | ... | ... |

841 → 25-Jan-2021 row
842 → vcpu
843 → memory
844 → storage
845 → 27-Jan-2021 row
846 → 28-Jan-2021 row

*FIG. 8B*

| Date/Policy ID (Metering Tier) | P100 (Advanced) | P200 (Premium) | P300 (Premium) | P301 (Advanced) | P400 (Advanced) | P500 (Premium) |
|---|---|---|---|---|---|---|
| ... | ... | ... | ... | ... | ... | ... |
| ⊟ 29-Jan-2021 | | | | | | |
| vcpu | 0 | 96 | 0 | 1 | 1 | 8 |
| memory | 0 | 384x | 0 | 3x | 5x | 32x |
| | 0 | 384GB | 0 | 4GB | 6GB | 64GB |
| storage | 0 | 19200GB | 0 | 100GB | 100GB | 1600GB |
| ⊟ 30-Jan-2021 | | | | | | |
| vcpu | 0 | 96 | 0 | 1 | 1 | 8 |
| memory | 0 | 384x | 0 | 3x | 5x | 32x |
| | 0 | 384GB | 0 | 4GB | 6GB | 64GB |
| storage | 0 | 19200GB | 0 | 100GB | 100GB | 1600GB |
| ⊟ 31-Jan-2021 | | | | | | |
| vcpu | 0 | 96 | 0 | 1 | 1 | 8 |
| memory | 0 | 384x | 0 | 3x | 5x | 32x |
| | 0 | 384GB | 0 | 4GB | 6GB | 64GB |
| storage | 0 | 19200GB | 0 | 100GB | 100GB | 1600GB |
| Total | 7 | 670 | 90 | 4 | 7 | 27 |

| TE3 - Measured | | | | | | | |
|---|---|---|---|---|---|---|---|
| Metering Tier | 25-Jan-2021 | 26-Jan-2021 | 27-Jan-2021 | 28-Jan-2021 | 29-Jan-2021 | 30-Jan-2021 | 31-Jan-2021 | Total |
| ☐ Basic | 0 | 0 | 0 | 0 | 0 | 0 | 0 | 0 |
| Basic_vcpu | 0 | 0 | 0 | 0 | 0 | 0 | 0 | 0 |
| Basic_memory | 0 | 0 | 0 | 0 | 0 | 0 | 0 | 0 |
| Basic_storage | 0 | 0 | 0 | 0 | 0 | 0 | 0 | 0 |
| ☐ Advanced | 3 | 3 | 3 | 3 | 2 | 2 | 2 | 18 |
| Advanced_vcpu | 19x | 19x | 19x | 15x | 7x | 7x | 7x | 93x |
| Advanced_memory | 34GB | 34GB | 34GB | 24GB | 10GB | 10GB | 10GB | 156GB |
| Advanced_storage | 940GB | 940GB | 940GB | 620GB | 200GB | 200GB | 200GB | 4040GB |
| ☐ Premium | 120 | 120 | 118 | 117 | 104 | 104 | 104 | 787 |
| Premium_vcpu | 456x | 456x | 448x | 450x | 416x | 416x | 416x | 2608x |
| Premium_memory | 480GB | 480GB | 472GB | 480GB | 448GB | 448GB | 448GB | 3256GB |
| Premium_storage | 21600GB | 21600GB | 21200GB | 21600GB | 20800GB | 20800GB | 20800GB | 148400GB |

*FIG. 8C*

TE3 – Rate Card

| Metering Tier | vcpu (per x) | memory (per GB) | storage (per GB) |
|---|---|---|---|
| Basic | 1.4 | 0.7 | 0.005 |
| Advanced | 2.2 | 1.1 | 0.015 |
| Premium | 3.5 | 1.8 | 0.030 |

*FIG. 8D*

TE3 - Billed

| Metering Tier | vcpu | memory | storage |
|---|---|---|---|
| ⊞ Basic | 0 | 0 | 0 |
| ⊞ Advanced | 204.60 | 171.60 | 60.60 |
| ⊟ Premium | 9128.00 | 5860.80 | 4452.00 |
| 25-Jan-2021 | 1596.00 | 864.00 | 648.00 |
| ... | ... | ... | ... |
| 31-Jan-2021 | 1456.00 | 806.40 | 624.00 |
| Total | 9332.60 | 6032.40 | 4512.60 |

*FIG. 8E*

TE3 – Expected

| Date/Policy ID (Metering Tier) | P100 (Advanced) | P200 (Premium) | P300 (Premium) | P301 (Advanced) | P400 (Advanced) | P500 (Premium) |
|---|---|---|---|---|---|---|
| ☐ 21-Dec-2020 | | | | | | |
| vcpu | 2 | 96 | 24 | 0 | 1 | 0 |
| memory | 14x | 384x | 72x | 0 | 5x | 0 |
| memory | 28GB | 384GB | 96GB | 0 | 6GB | 0 |
| storage | 840GB | 19200GB | 2400GB | 0 | 100GB | 0 |
| ☐ 22-Dec-2020 | | | | | | |
| vcpu | 2 | 96 | 24 | 0 | 1 | 0 |
| memory | 14x | 384x | 72x | 0 | 5x | 0 |
| memory | 28GB | 384GB | 96GB | 0 | 6GB | 0 |
| storage | 840GB | 19200GB | 2400GB | 0 | 100GB | 0 |
| ☐ 23-Dec-2020 | | | | | | |
| vcpu | 2 | 96 | 16 | 0 | 1 | 0 |
| memory | 14x | 376x | 54x | 0 | 5x | 0 |
| memory | 28GB | 376GB | 72GB | 0 | 6GB | 0 |
| storage | 840GB | 18800GB | 1800GB | 0 | 100GB | 0 |
| ☐ 24-Dec-2020 | | | | | | |
| vcpu | 1 | 96 | ... | 1 | 1 | 3 |
| memory | 0 | 384x | | 7x | 5x | 12x |
| memory | 0 | 384GB | | 14GB | 6GB | 24GB |
| storage | 0 | 19200GB | | 420GB | 100GB | 600GB |
| ... | ... | | | | | |

911 → (23-Dec-2020)
912 → (24-Dec-2020)

FIG. 9A

| Date/Policy ID (Metering Tier) | P100 (Advanced) | P200 (Premium) | P300 (Premium) | P301 (Advanced) | P400 (Advanced) | P500 (Premium) |
|---|---|---|---|---|---|---|
| ... | ... | ... | ... | ... | ... | ... |
| ⊟ 25-Dec-2020 | 0 | 96 | 0 | 1 | 1 | 8 |
| vcpu | 0 | 384x | 0 | 3x | 5x | 32x |
| memory | 0 | 384GB | 0 | 4GB | 6GB | 64GB |
| storage | 0 | 19200GB | 0 | 100GB | 100GB | 1600GB |
| ⊟ 26-Dec-2020 | 0 | 96 | 0 | 1 | 1 | 8 |
| vcpu | 0 | 384x | 0 | 3x | 5x | 32x |
| memory | 0 | 384GB | 0 | 4GB | 6GB | 64GB |
| storage | 0 | 19200GB | 0 | 100GB | 100GB | 1600GB |
| ⊟ 27-Dec-2020 | 0 | 96 | 0 | 1 | 1 | 8 |
| vcpu | 0 | 384x | 0 | 3x | 5x | 32x |
| memory | 0 | 384GB | 0 | 4GB | 6GB | 64GB |
| storage | 0 | 19200GB | 0 | 100GB | 100GB | 1600GB |
| Total | 7 | 672 | 88 | 4 | 7 | 27 |

| Date Time | Tenant | Policies Activated |
|---|---|---|
| 21-Dec-2020 00:15 | TE1 | P200 |
| 21-Dec-2020 00:30 | TE1 | P200 |
| 21-Dec-2020 00:45 | TE1 | P200 |
| 21-Dec-2020 01:00 | TE1 | P200, P300 |
| 21-Dec-2020 01:15 | TE1 | P200 |
| 21-Dec-2020 01:30 | TE1 | P200 |
| 21-Dec-2020 01:45 | TE1 | P200, P300 |
| 21-Dec-2020 02:00 | TE1 | P200 |
| ... | ... | ... |
| 21-Dec-2020 12:00 | TE1 | P200, P300, P100 |
| ... | ... | ... |
| 21-Dec-2020 23:45 | TE1 | P200, P300, P100, P400 |
| 21-Dec-2020 24:00 | TE1 | P200 |
| 23-Dec-2020 10:15 | TE1 | P200 |
| 23-Dec-2020 10:30 | TE1 | P200 |
| 23-Dec-2020 10:45 | TE1 | P200 |
| 23-Dec-2020 11:00 | TE1 | P200, P300 |

| Date Time | Tenant | Policies Activated |
|---|---|---|
| ... | ... | ... |
| 24-Dec-2020 12:00 | TE1 | P200, P300, P100 |
| ... | ... | ... |
| 24-Dec-2020 16:00 | TE1 | P200, P300 |
| 24-Dec-2020 16:15 | TE1 | P200 |
| 24-Dec-2020 16:30 | TE1 | P200 |
| 24-Dec-2020 16:45 | TE1 | P200 |
| 24-Dec-2020 17:00 | TE1 | P200 |
| 24-Dec-2020 17:15 | TE1 | |
| 24-Dec-2020 18:00 | TE1 | P200, P500 |
| ... | ... | ... |
| 24-Dec-2020 24:00 | TE1 | P200, P400, P301, P500 |
| 27-Dec-2020 23:45 | TE1 | P200 |
| 27-Dec-2020 24:00 | TE1 | P200, P400, P301, P500 |

FIG. 9B

| TE3 - Expected | | | | | | | | |
|---|---|---|---|---|---|---|---|---|
| Metering Tier | 25-Jan-2021 | 26-Jan-2021 | 27-Jan-2021 | 28-Jan-2021 | 29-Jan-2021 | 30-Jan-2021 | 31-Jan-2021 | Total |
| ☐ Basic | 0 | 0 | 0 | 0 | 0 | 0 | 0 | 0 |
| Basic_vcpu | 0 | 0 | 0 | 0 | 0 | 0 | 0 | 0 |
| Basic_memory | 0 | 0 | 0 | 0 | 0 | 0 | 0 | 0 |
| Basic_storage | 0 | 0 | 0 | 0 | 0 | 0 | 0 | 0 |
| ☐ Advanced | 3 | 3 | 3 | 3 | 2 | 2 | 2 | 18 |
| Advanced_vcpu | 19x | 19x | 19x | 15x | 7x | 7x | 7x | 93x |
| Advanced_memory | 34GB | 34GB | 34GB | 24GB | 10GB | 10GB | 10GB | 156GB |
| Advanced_storage | 940GB | 940GB | 940GB | 620GB | 200GB | 200GB | 200GB | 4040GB |
| ☐ Premium | 120 | 120 | 120 | 115 | 104 | 104 | 104 | 787 |
| Premium_vcpu | 456x | 456x | 456x | 444x | 416x | 416x | 416x | 2610x |
| Premium_memory | 480GB | 480GB | 480GB | 472GB | 448GB | 448GB | 448GB | 3256GB |
| Premium_storage | 21600GB | 21600GB | 21600GB | 21400GB | 20800GB | 20800GB | 20800GB | 148600GB |

*FIG. 9C*

| Metering Comparison | | |
|---|---|---|
| Metering Tier | Measured 961 | Expected 962 |
| ⊞ Basic ← 971 | 0 | 0 |
| ⊟ Advanced ← 972 | 18 | 18 |
| Advanced_vcpu | 93x | 93x |
| Advanced_memory | 156GB | 156GB |
| Advanced_storage | 4040GB | 4040GB |
| ⊟ Premium ← 973 | 787 | 787 |
| Premium_vcpu ← 974 | 2608x | 2610x |
| Premium_memory ← 975 | 3256GB | 3256GB |
| Premium_storage ← 976 | 148400GB | 148600GB |

| Billing Comparison | vcpu | | memory | | storage | |
|---|---|---|---|---|---|---|
| Metering Tier | Measured | Expected | Measured | Expected | Measured | Expected |
| ⊞ Basic | 0 | 0 | 0 | 0 | 0 | 0 |
| ⊞ Advanced | 204.60 | 204.60 | 171.60 | 171.60 | 60.60 | 60.60 |
| ⊟ Premium | 9128.00 | 9135.00 | 5860.80 | 6346.80 | 4452.00 | 4458.00 |
| ... | ... | ... | ... | ... | ... | ... |
| 27-Jan-2021 | 1568.00 | 1596.00 | 849.60 | 864.00 | 636.00 | 648.00 |
| 28-Jan-2021 | 1575.00 | 1554.00 | 864.00 | 849.60 | 648.00 | 642.00 |
| ... | ... | ... | ... | ... | ... | ... |
| Total | 9332.60 | 9339.60 | 6032.40 | 6518.40 | 4512.60 | 4518.60 |

FIG. 9E

VALIDATING METERING OF A DISASTER RECOVERY SERVICE USED IN CLOUDS

PRIORITY CLAIM

The instant patent application is related to and claims priority from the co-pending India provisional patent application entitled, "VALIDATING METERING OF A CONSUMPTION BASED DISASTER RECOVERY SERVICE USED BY CLOUDS", Serial No.: 202041007046, Filed: 19 Feb. 2020, which is incorporated in its entirety herewith.

BACKGROUND OF THE DISCLOSURE

Cloud refers to a virtual infrastructure provided on a collection of processing systems, connectivity infrastructure, data storages, etc. The virtual infrastructure contains computing resources (e.g., virtual machines, operating systems) and storage resources (e.g., database servers, file systems). A customer/owner (also known as tenant) of a cloud may deploy desired user applications/data services on the resources provided as a part of their cloud(s), with the services capable of processing user requests received from end user systems.

Disaster recovery (DR) generally entails backing up of pertinent data at various time instances, and upon occurrence of a disaster, making pertinent applications and data operative based on the backed-up data within acceptable time frames and acceptable data loss. Thus, databases storing pertinent data in a storage node may be backed up to a backup node and applications may also be made operative in the backup node upon occurrence of a disaster in the storage node.

Disaster recovery is often provided as a service (such as Disaster-Recovery-as-a-Service or DRaaS) to one or more customers. Each customer may be billed for usage of the service. Metering implies measurement of such usage for each customer for purposes such as billing and planning.

There is a general need to validate metering of a disaster recovery service at least to ensure that the measurements captured by the metering for each cloud/customer are accurate.

BRIEF DESCRIPTION OF THE DRAWINGS

Example embodiments of the present disclosure will be described with reference to the accompanying drawings briefly described below.

FIG. 2A illustrates an example execution state within a node of a computing infrastructure.

FIG. 2B illustrates the manner in which clouds are hosted in computing infrastructures in one embodiment.

FIGS. 4A-4D depicts user interfaces used for specifying the setup of a disaster recovery service in a cloud in one embodiment.

FIG. 5A depicts portions of category data specifying details of cloud resources (VMs) deployed in a cloud in one embodiment.

FIG. 5B depicts portions of policy data specifying details of disaster recovery policies setup in a cloud in one embodiment.

FIG. 8A depicts portions of DRS usage information collected for a cloud in one embodiment.

FIG. 8B depicts the manner in which the DRS usage in a cloud is metered in one embodiment.

FIG. 8C depicts the manner in which the DRS usage in a cloud is billed in one embodiment.

FIG. 8D depicts a rate card according to which a customer/tenant is billed in one embodiment.

FIG. 8E depicts the manner in which the DRS usage in a cloud is billed in one embodiment.

FIG. 9A depicts portions of expected (metering) values representing expected usage of DRS in a cloud in one embodiment.

FIG. 9B depicts portions of DRS usage information collected for a cloud in one embodiment.

FIG. 9C depicts the manner in which expected values for a cloud is collated based on metering tiers in one embodiment.

FIG. 9D depicts the manner in which expected values are compared with measured values to validate metering of usage of DRS in a cloud in one embodiment.

FIG. 9E depicts the manner in which expected values are compared with measured values to validate billing of usage of DRS in a cloud in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
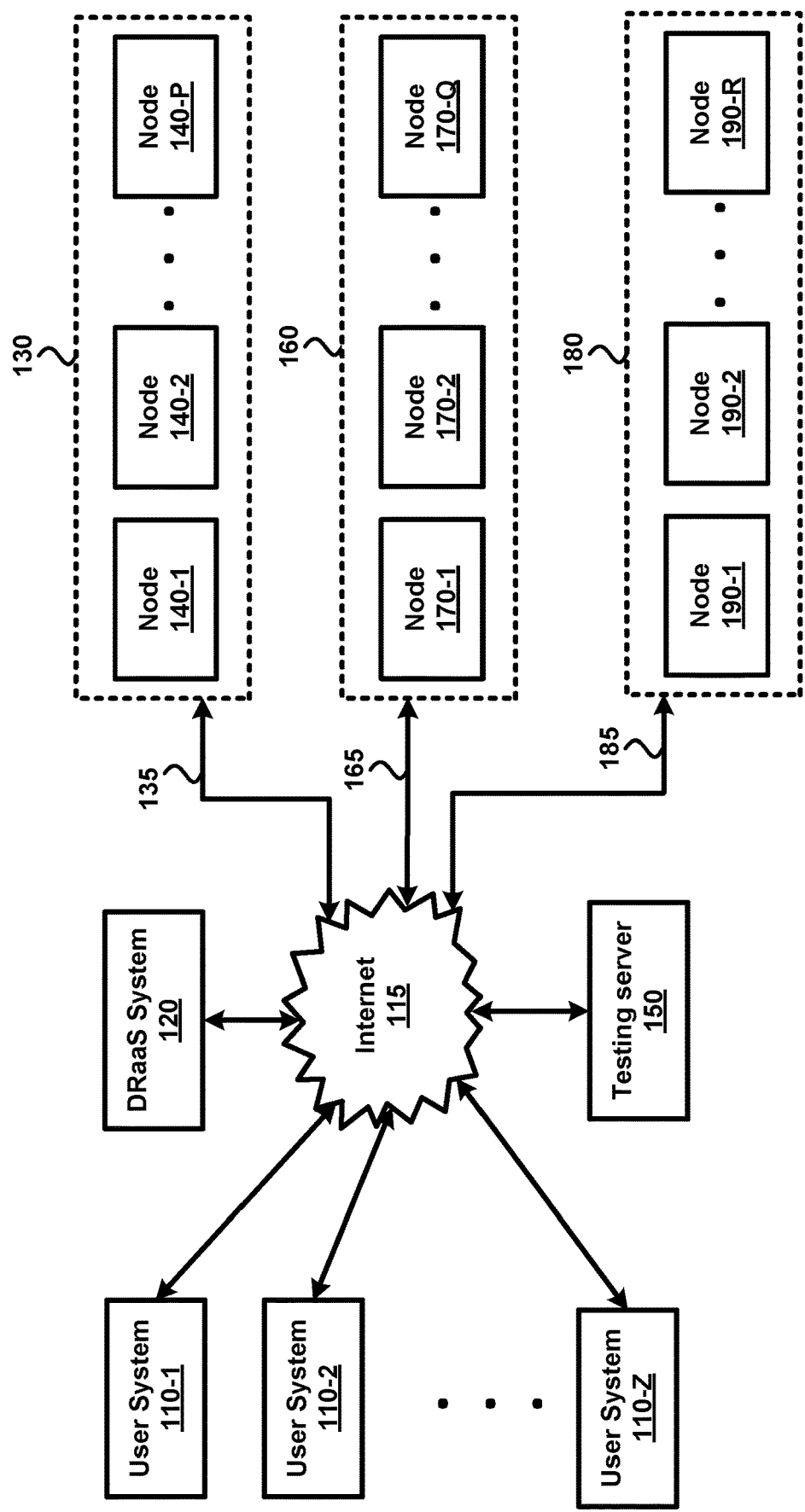
FIG. 1 is a block diagram illustrating an example environment (computing system) in which several aspects of the present invention can be implemented.

An aspect of the present disclosure facilitates validating metering of a disaster recovery service used in clouds. In one embodiment, a system receives a request to validate metering of usage of a disaster recovery service (DRS) in a first cloud. The system collects from a metering service of the DRS, measured values representing the actual usage of the DRS in a second cloud and then compares the measured values with corresponding expected values representing expected usage of the DRS in the second cloud. The system sends a response to the request based on a result of the comparing. In one embodiment, the request is received from a tenant (customer/owner) owning the first cloud.

According to yet another aspect of the present disclosure, the DRS in the first cloud is setup to operate according to a first configuration specifying respective disaster recovery policies applicable to corresponding cloud resources in the first cloud. The DRS in the second cloud is also setup with the disaster recovery policies specified in the first configuration. As such, the operation of the second cloud is similar to the first cloud (of the tenant) with respect to the usage of the DRS.

According to one more aspect of the present disclosure, the expected values (noted above) correspond to prior values representing actual usage of the DRS in the first cloud in a past duration when the first cloud was operating based on the first configuration, the measured values corresponding to a first duration after receipt of the request, where the first duration equals the past duration.

According to yet another aspect of the present disclosure, the first configuration is received along with the request. The system (noted above) then examines prior configurations setup for the DRS in the first cloud to identify a prior duration having a corresponding prior configuration matching the first configuration, as the past duration.

According to an aspect of the present disclosure, the system (noted above) provides a user interface to enable a user (customer/owner, administrator, etc.) to specify a first set of disaster recovery policies and submit the first set of disaster recovery policies as the first configuration of the first cloud. The request (noted above) and the first configuration are received in response to the user submission using the user interface.

According to another aspect of the present disclosure, the system (noted above) selects the past duration and identifies a prior configuration applicable to the selected past duration as the first configuration.

According to one more aspect of the present disclosure, the first cloud is provided based on a first cloud infrastructure. Accordingly, the system (noted above) in response to the request, prepares the second cloud in a second cloud infrastructure and configures the DRS in the second cloud according to the first configuration. The second cloud is separate and distinct from the first cloud (of the tenant) whose metering is sought to be validated.

According to yet another aspect of the present disclosure, the first cloud contains a first primary site and a first secondary site, wherein the DRS in the first cloud is setup to backup cloud resources from the first primary site to the first secondary site according to the first configuration. In one embodiment, the cloud resources are virtual machines provisioned as part of the first cloud.

According to an aspect of the present disclosure, the first cloud is a hybrid cloud in which the first primary site is hosted in a on-premises infrastructure and the first secondary site is hosted in the first cloud infrastructure, while the second cloud is a multi-cloud cloud comprising a second primary site and a second secondary site, both being hosted in the second cloud infrastructure.

According to another aspect of the present disclosure, the system (noted above) performs collecting from a first time instance to a second time instance, where the first time instance is after receipt of the request. Upon receiving at a third time instance (between the first time instance and a second time instance) an indication that the DRS in the first cloud has been changed to operate according to a second configuration, the system modifies the second cloud to also operate according to the second configuration and continues collecting the measured values from the modified second cloud in a duration between the third time instance and the second time instance.

According to an aspect of the present disclosure, a customer/owner of a cloud is facilitated to validate metering of a disaster recovery service (DRS) used in his/her first cloud. The customer (using a user system) sends a request to validate metering of usage of a disaster recovery service (DRS) in the first cloud and receives a response to the request based on a result of a comparison of measured values representing the actual usage of the DRS in a second cloud and corresponding expected values representing expected usage of the DRS in the second cloud.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing user systems 110-1 through 110-Z (Z representing any natural number), Internet 115, disaster recovery as a service (DRaaS) system 120, testing server 150, and computing infrastructures 130, 160 and 180. Computing infrastructure 130 in turn is shown containing nodes 140-1 through 140-P (P representing any natural number). Computing infrastructure 160 in turn is shown containing nodes 170-1 through 170-Q (Q representing any natural number). Computing infrastructure 180 in turn is shown containing nodes 190-1 through 190-R (R representing any natural number). The user systems and nodes are collectively referred to by 110, 140, 170 and 190 respectively.

Merely for illustration, only representative number/type of systems is shown in FIG. 1. Many environments often contain many more systems, both in number and type, depending on the purpose for which the environment is designed. Each block of FIG. 1 is described below in further detail.

Each of computing infrastructures 130, 160 and 180 is a collection of physical processing nodes (140, 170 and 190), connectivity infrastructure, data storages, administration systems, etc., which are engineered to together provide a virtual computing infrastructure for various customers, with the scale of such virtual computing being specified often on demand. Computing infrastructure 130/160/180 may correspond to a public cloud infrastructure such as Amazon Web Services (AWS) Cloud available from Amazon.com, Inc., Google Cloud Platform (GCP) available from Google LLC, Azure cloud available from Microsoft, Inc., Xi cloud available from Nutanix etc. Computing infrastructure 130/160/180 may also correspond to one of the On-Premises (On-Prem) enterprise systems owned by corresponding customers. Alternatively, computing infrastructure 130/160/180 may correspond to a third-party data center provided by a cloud service provider.

In one embodiment, computing infrastructures 130 and 160 are On-Prem (on premises) enterprise systems owned by corresponding customers, while computing infrastructure 180 is a public cloud infrastructure such as AWS Cloud noted above. Accordingly, in the following description, the terms on-prem system 130/160 and cloud infrastructure 180 are used interchangeably with computing infrastructures 130/160/180. However, aspects of the present disclosure can be implemented in other environments as well such as when 130/160/180 are all public cloud infrastructures or when 130/160/180 are third party data centers, as will be apparent to one skilled in the relevant arts by reading the disclosure herein.

All the systems of each computing infrastructure 130/160/180 are assumed to be connected via an intranet. Internet 115 extends the connectivity of these (and other systems of the computing infrastructures) with external systems such as user systems 110 and testing server 150. Each of intranet and Internet 115 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 115 and intranets. When the packet contains content such as port numbers, which specifies a target application, the packet may be said to be directed to such application as well.

Each of user systems 110 represents a system such as a personal computer, workstation, mobile device, computing tablet etc., used by users to generate (user) requests directed to enterprise/user applications executing in computing infrastructures 130/160/180. The user requests may be generated using appropriate user interfaces (e.g., web pages provided by a user application executing in a node, a native user interface provided by a portion of a user application downloaded from a node, etc.).

In general, a user system requests a user application for performing desired tasks and receives the corresponding responses (e.g., web pages) containing the results of performance of the requested tasks. The web pages/responses may then be presented to the user by local applications such as the browser. Each user request is sent in the form of an IP packet directed to the desired system or user application, with the IP packet including data identifying the desired tasks in the payload portion.

Some of nodes 140/170/190 may be implemented as corresponding data stores. Each data store represents a non-volatile (persistent) storage facilitating storage and retrieval of data by applications executing in the other systems/nodes of computing infrastructures 130/160/180. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 140/170/190 may be implemented as corresponding server systems. Each server system represents a server, such as a web/application server, executing enterprise applications (examples of user applications) capable of performing tasks requested by users using user systems 110. A server system receives a user request from a user system and performs the tasks requested in the user request. A server system may use data stored internally (for example, in a non-volatile storage/hard disk within the server system), external data (e.g., maintained in a data store/node) and/or data received from external sources (e.g., from the user) in performing the requested tasks. The server system then sends the result of performance of the tasks to the requesting user system (one of 110) as a corresponding response to the user request. The results may be accompanied by specific user interfaces (e.g., web pages) for displaying the results to the requesting user.

In one embodiment, each customer is provided with a corresponding virtual computing infrastructure (referred to as a "cloud") provisioned on the nodes of computing infrastructures 130, 160 and 180. The manner in which clouds may be provisioned in computing infrastructures is described below with examples.

3. Hosting Clouds in Computing Infrastructures

In one embodiment, virtual machines (VMs) form the basis for deployment of various user/enterprise applications in the nodes of computing infrastructures 130/160/180. As is well known, a virtual machine may be viewed as a container in which other execution entities are executed. A node/server system can typically host multiple virtual machines, and the virtual machines provide a view of a complete machine (computer system) to the user applications executing in the virtual machine. In the disclosure here, any resource, such as the VM, that is to be backed-up (and later restored) is referred to as a cloud resource. Such cloud resources are in contrast to infrastructure resources (e.g., CPU, memory, storage) that are consumed/used by VMs.

FIG. 2A illustrates an example execution state within a node of a computing infrastructure. Node 140-1 is shown provisioned with, and accordingly hosting VMs 211, 212, 213, with the resources of the node shown allocated among the three VMs and some resources shown as still remaining 'unused' (i.e., not provisioned for any execution entity within node 140-1). Some of VMs 211-213 is shown hosting guest (modules) 221 and 222. Guest modules 221/222 may correspond to one of an application service or infrastructure component provided as part of a user application.

Each of VMs 211-213 is associated with a corresponding resource definition which specifies the infrastructure resources required for/used by the VM during its operation. The resource definition typically is in the form of a triplet <C, M, S>, where C is the number of (virtual) CPU cycles (e.g. 1×, 2×, 4×), M is the amount of memory (RAM) in gigabytes (e.g. 1 GB, 2 GB, 4 GB) and S is the amount of persistent storage in gigabytes (e.g. 50 GB, 100 GB, 200 GB).

In one embodiment, a cloud for a customer/tenant is provisioned (created) by allocating a desired number of VMs hosted on nodes 140/170/190 in cloud infrastructures 130/160/18. Each VM in the cloud may have a corresponding resource definition. Multiple VMs may also have the same resource definition. The manner in which multiple clouds are provisioned in cloud infrastructures 130/160/180 is described below with examples.

FIG. 2B illustrates the manner in which clouds are hosted in computing infrastructures in one embodiment. Specifically, the Figure illustrates the manner in which clouds 220, 240 and 260 are deployed in the nodes of computing infrastructures 130/160/180 using VMs. Only a sample set of clouds is shown in FIG. 2B for illustration, though many environments often host a large number (100+) clouds across multiple computing infrastructures.

Cloud 230 is shown containing VMs 230-1 through 230-M (M representing any natural number) that may be provisioned on nodes 140 of on-prem system 130 and nodes 190 of cloud infrastructure 180. As is well known, a cloud containing a mixture of VMs provisioned in an on-prem system and VMs provisioned in a cloud infrastructure are referred to as "hybrid" cloud. Hybrid clouds are distinguished from other clouds that operate based on VMs provisioned on one or more cloud infrastructures. Cloud 230 is accordingly a hybrid cloud provisioned across the nodes of multiple computing infrastructures (130 and 190). Specifically, groups 230A and 230B respectively represents the set of VMs provisioned in on-prem system 130 and cloud infrastructure 180.

Similarly, cloud 240 is another hybrid cloud containing VMs 240-1 through 240-N(N representing any natural number) that may be provisioned on nodes 170 of on-prem system 160 and nodes 190 of cloud infrastructure 180. Specifically, groups 240A and 240B respectively represents the set of VMs provisioned in on-prem system 160 and cloud infrastructure 180. For illustration, it is assumed that each cloud (230 and 240) is owned by a corresponding customer/tenant.

A customer owning a cloud (e.g., 230) typically specifies the desired number of VMs to be part of the cloud. The customer/tenant may then deploy desired user applications for execution in his/her cloud. The desired user application may be designed to be operative based on corresponding customer-specified configurations. In addition, data gets accrued in an application over time and includes the user interaction driven changes that have happened in the user application. For example, data entered by users using the user interfaces provided by the user application are accrued over time.

It may accordingly be desirable that such user application data (configuration and accrual data) be preserved even in the occurrence of natural or man-made disasters such as a power outage, hardware failure, file corruption, human error, earthquake, flood, hurricane/tornado, thunderstorm, wildfire, winter weather, etc. As such, the customer/tenant may employ disaster recovery wherein the pertinent applications and data are backed up at various time instances, and upon occurrence of a disaster, the pertinent applications and data are made operative based on the backed-up data within acceptable time frames and acceptable data loss.

For example, the customer owning cloud 230 may identify that group 230A is a primary site and that group 230B is a secondary site, and then setup to regularly backup cloud resources from the primary site (230A) to the secondary site (230B). In one embodiment, the cloud resources are virtual machines (VMs 230-1 through 230-M) provisioned as part of cloud 230. The manner in which disaster recovery may be provided in clouds is described below with examples.

4. Disaster Recovery in Clouds

Referring again to FIG. 1, DRaaS system 120 provides disaster recovery as a service to one or more customers. As is well known, a DRaaS system (120) provides for replication of physical servers (nodes) or virtual servers (VMs) to provide failover in the event of a man made or natural disaster. DRaaS can be especially useful to customers that lack the necessary expertise to provision, configure, and test an effective disaster recovery plan.

DRaaS system 120 facilitates backing up of pertinent data stored at a primary site at various time instances, and upon occurrence of a disaster, making pertinent applications and data operative in a secondary site based on the backed-up data within acceptable time frames (commonly referred to as Recovery Time Objective or RTO) and acceptable data loss (commonly referred to as Recovery Point Objective or RPO).

In one embodiment, a customer (e.g., owner of cloud 230) uses the nodes on his/her on-prem infrastructure (group 230A) as the primary site for deployment of user applications, while using the nodes on cloud infrastructure (group 230B) as the secondary site for disaster recovery. By adopting such hybrid cloud architecture, customers can failover to cloud infrastructure (180) at the time of disaster. In one embodiment, each customer is billed/charged only for the usage of the DRaaS, that is the DRaaS is a consumption-based disaster recovery service.

In addition, a customer may wish to migrate (partial if not full) their workload from pure On-Prem systems to cloud infrastructure, especially when the cloud infrastructure supports consumption-based charging model. The customer may wish to protect their On-Prem workload and data via DRaaS but does not wish to invest heavily on duplicating the On-Prem systems (data centers). Again, the customer desire is for low-costing DR along with the flexibility to opt the payment model (i.e., consumption-based model).

Figure 2C:
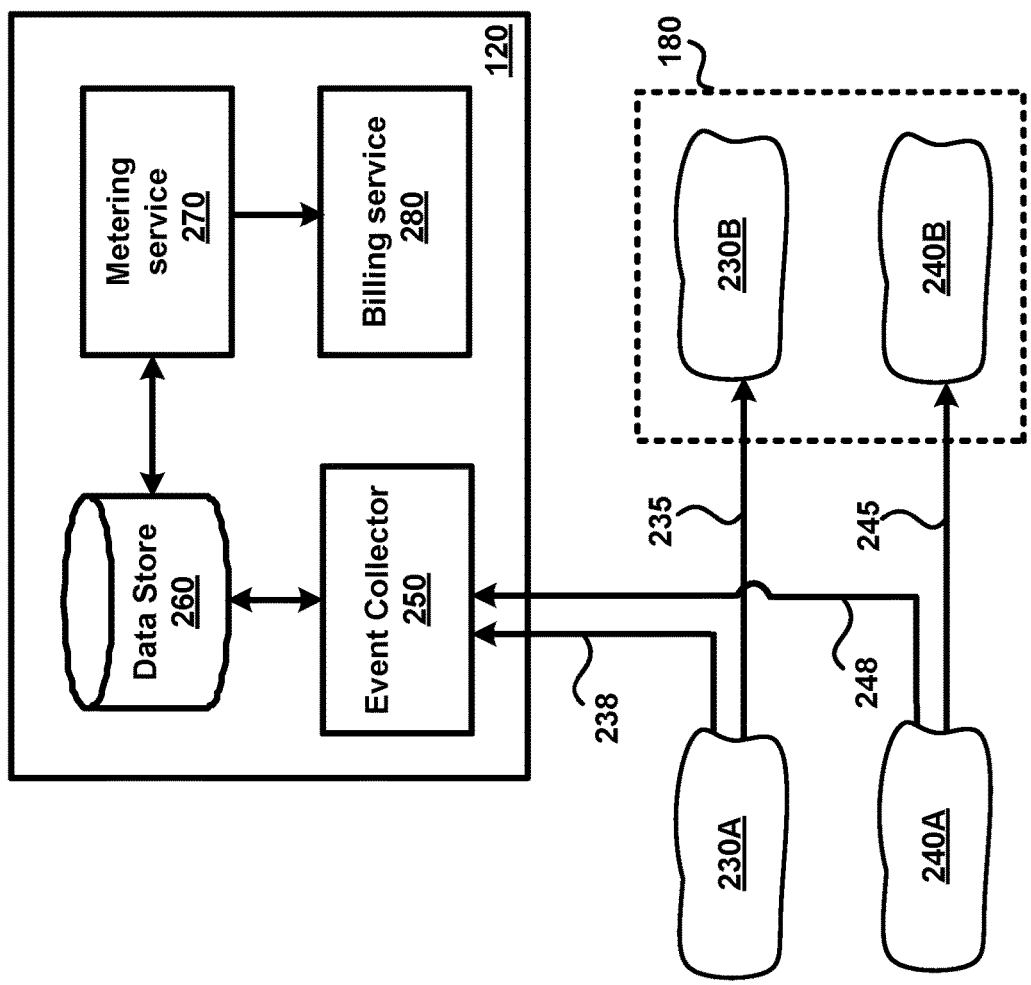
FIG. 2C illustrates the manner in which disaster recovery as a service is provided for multiple clouds/customers in one embodiment.

FIG. 2C illustrates the manner in which disaster recovery as a service is provided for multiple clouds/customers in one embodiment. DRaaS 120 is shown containing event collector 250, data store 160, metering service 270 and billing service 280. Each of the blocks is described in detail below.

DRaaS 120 is shown facilitating the backup/replication of data at various time instances (referred to as snapshots) from primary sites to corresponding secondary sites for different clouds. In particular, for cloud 230, the backup is shown occurring from group 230A (primary site) to group 230B (secondary site) as indicated by arrow 235, while for cloud 240 (owned by the same or a different customer), the backup is shown occurring from group 240A (primary site) to group 240B (secondary site) as indicated by arrow 245. It may be observed that the primary sites are located on On-Prem systems/infrastructures, while the secondary sites are hosted on cloud infrastructure 180.

In one embodiment, each cloud (including the primary and second sites) is associated with a unique identifier referred to as "tenant_ID", to facilitate DRaaS 120 to distinguish between the various clouds using the disaster recovery service. In the following disclosure, it is assumed that the tenant_ID associated with cloud 230 (and by extension 230A and 230B) is "TE1", while the tenant_ID associated with cloud 240 (240A and 240B) is "TE2".

Event collector 250 collects information from nodes 140/170, in particular, in relation to the backups performed for VMs executing in those nodes. The information may include the number and/or frequency of backups of each VM performed for the purpose of disaster recovery, the size of the backup, etc. The collected information also includes the tenant_ID to enable event collector 250 to determine the specific cloud for which the information has been collected. The event collection may be performed at regular intervals (typically, every 1 minute, hereinafter referred to as "collection interval") to capture the dynamic replication of VMs for different customers (indicated by arrows 238 and 248). Event collector 250 then stores the collected information in a persistent storage such as data store 260.

Metering service 270 measures the DR backups performed for each cloud (230, 240) during corresponding durations. Metering service 270 retrieves the information stored in data store 260, determines the backups performed in each cloud (based on tenant_ID) and aggregates the usage (number and/or frequency of backups) for larger intervals (e.g., 15 minutes, hereinafter referred to as "metering intervals"). Metering service 270 may maintain the measured resource usage data in a persistent storage (data store 260). Metering service 270 also forwards the measured values to billing service 280.

In one embodiment, metering service 270 calculates the resource consumption units at the defined granularity level. For disaster-recovery service in hybrid clouds, the Units-of-Measurement (UoM) are DR RPO per-MINUTE level, DR RPO per-HOUR level, DR RPO per-DAY level. Customers configure or select desired RPO levels and send this information to a central database (hosted on any public cloud), with metering service 270 retrieving the data from this central database and computing the consumption usage for past durations min/hour/day and post these computations to billing service 280 in a periodic way (which is configurable).

Billing service 280 bills customers/tenants based on the DR usage of their cloud (again identified based on the tenant_ID). Billing service 280 receives the measured values from metering service 270, and aggregates the received values for larger intervals (e.g., hourly, daily, etc. hereinafter referred to as "billing intervals"), and then bills the customer/tenant based on a rate/cost associated with such usage. Billing service 280 processes the data coming from metering service 270 and converts them into invoices by applying the rate cards, discounting, offers etc. as is well known in the arts.

Thus, a customer/tenant is billed according to the dynamic DR usage by their cloud (230, 240). However, in some scenarios, a customer/tenant may wish to validate whether the metering (in turn, the billing) of the DR usage of their cloud is accurate.

For example, with the consumption-based charging model, it may be important to correctly validate the consumption of the DR service commonly associated with different tiers like daily, hourly, minute level data snapshots with corresponding pricing models. Validating the correctness of metering and billing in real-time for multi-pricing model DR-features may accordingly be challenging. While dealing with customer incidents regarding metering and billing correctness, it is really tough to validate the behavior in real-time.

Customer may change the metering consumption model (e.g., from daily to hourly) at any desired time, and checking whether such changes have been reflected in the metering of the DR service is also challenging. Furthermore, in hybrid clouds, testing the DR Service is quite challenging as the test is for the live stream of data from end to end (path 238) as per the customer workflow.

Testing server 150, provided according to several aspects of the present disclosure, facilitates validating of metering (service 270) of a consumption-based disaster-recovery service (120) in hybrid clouds (230 and 240). Though shown external to cloud infrastructure 180, in alternative embodiments, testing server 150 may be implemented internal to cloud infrastructure 180, for example, in one of nodes 190. The manner in which testing server 150 facilitate validating metering of a disaster recovery service is described below with examples.

5. Validating Metering of a Disaster Recovery Service

Figure 3:
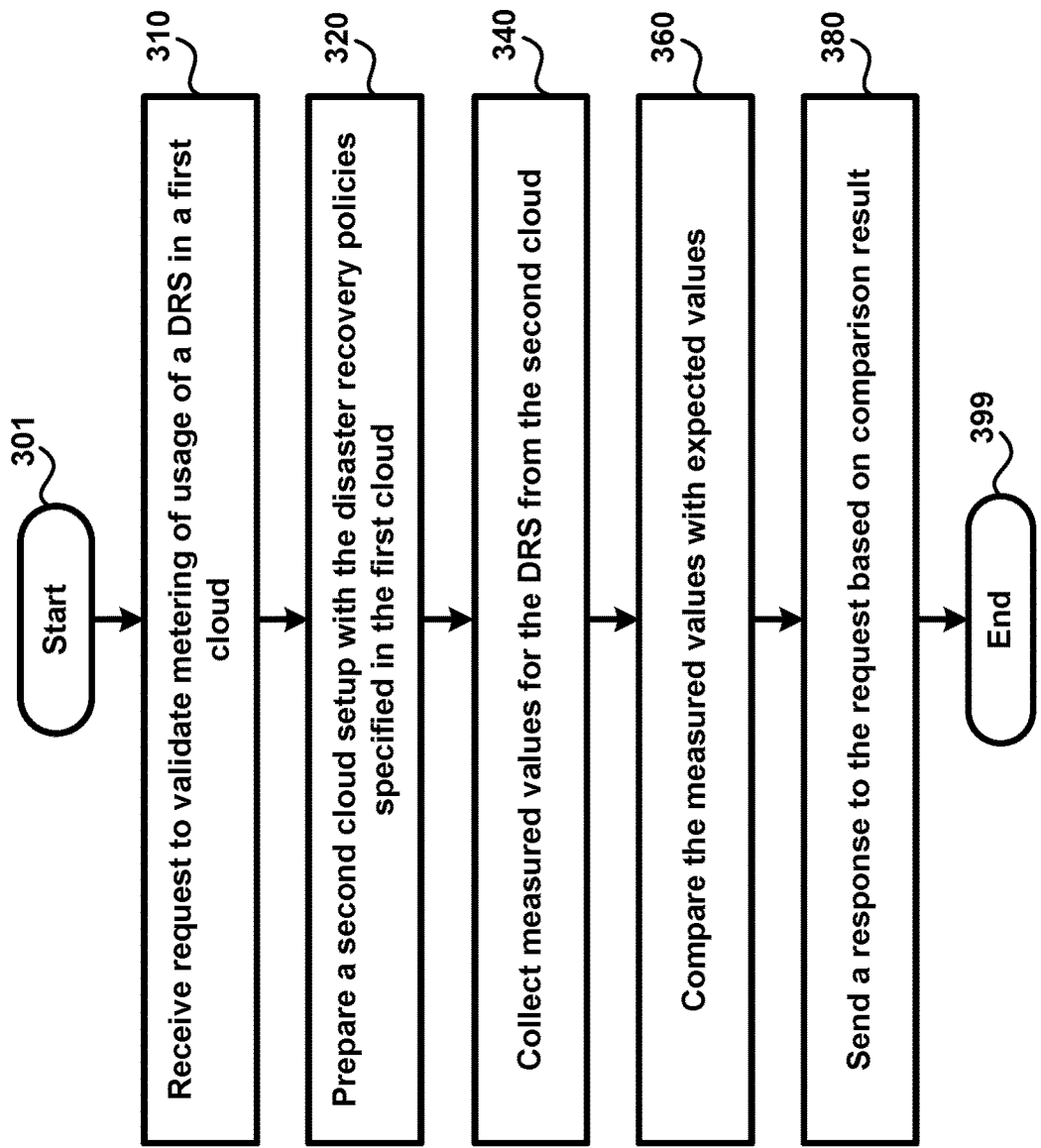
FIG. 3 is a flow chart illustrating the manner in which validating metering of a disaster recovery service use in clouds is performed according to an aspect of the present disclosure.

FIG. 3 is a flow chart illustrating the manner in which validating metering of a disaster recovery service use in clouds is performed according to an aspect of the present disclosure. The flowchart is described with respect to the systems of FIGS. 1 and 2, in particular testing server 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, testing server 150 receives a request to validate metering of usage of a DRS in a first cloud (assumed to be cloud 230 for illustration). The request may include details of the first cloud such as the VMs in the cloud, the resource definition of each VM, etc. The request may be received from a customer/tenant owning the first cloud (230) using one of user systems 110.

In step 320, testing server 150 prepare a second cloud setup with the disaster recovery policies specified in the first cloud. Preparing a second cloud may entail providing one or more nodes in a cloud infrastructure (assumed to be 180), provisioning multiple VMs in line with their corresponding resource definitions specified in the received request, and configuring the disaster recovery service to operation according to the disaster recovery policies specified in the first cloud. It should be noted that the second cloud is separate and distinct from the first cloud (230) whose metering is sought to be validated. In the following disclosure, it is assumed that the tenant_ID associated with the second cloud is "TE3".

In one embodiment, the received request includes a first configuration specifying the manner in which DRS in the first cloud (of the tenant) is setup to operate. In particular, the first configuration specifies respective disaster recovery policies applicable to corresponding resources in the first cloud. The second cloud is according setup to operate with the disaster recovery policies specified by the first configuration.

In step 340, testing server 150 collects measured values for the DRS from the second cloud. In particular, testing server 150 collects from a metering service (270) of the cloud infrastructure using the tenant_ID "TE3" of the second cloud, measured values representing the actual resources consumed by the second cloud provisioned in cloud infrastructure 180 in corresponding durations. The collecting may entail sending requests at regular intervals to metering service 270, and receiving the measured values as responses to the request. Alternatively, metering service 270 may be configured to push/send the measured values to testing server 150 at regular intervals.

In step 360, testing server 150 compares the measured values with corresponding expected/reference values representing expected usage of the DRS in the second cloud. The expected values may be pre-determined based on the DRS configuration of the second cloud. In one embodiment, the expected values are computed based on the first configuration received in the request.

In step 380, testing server 150 sends a response to the request (received in step 310) based on comparison result. Specifically, the response indicates whether the metering of the DRs used in the first cloud is accurate or not. In one embodiment, the comparison result specifies whether the measured values match the respective expected values in corresponding durations. Accordingly, the response indicates that the metering of the DRS used in the first cloud is accurate if the result specifies a match, and inaccurate otherwise. The flowchart ends in step 399.

It may be appreciated that match (with an acceptable margin of error) of the measured values and the expected values for the second cloud indicates the accuracy of the metering service 270 in general. By extension, metering of the specific cloud 230 is also deemed to be accurate as the same metering service is being used for metering/billing of specific cloud 230.

Thus, a customer/tenant of a cloud (230) is facilitated to validate whether the metering (in turn, the billing) of the resource usage of their cloud is accurate. It may be appreciated that the operation of FIG. 3 facilitates to validate the metering service (270) of a disaster recovery service provider (120) as well. The manner in which testing server 150 operates in accordance with the steps of FIG. 3 to provide several aspects of the present disclosure is described below with examples.

6. Illustrative Example

FIGS. 4A-4D, 5A-5B, 6A-6B, 7, 8A-8E and 9A-9D together illustrate the manner in which validation of metering of a consumption-based disaster recovery service used in clouds is performed in one embodiment. Each of the Figures is described in detail below.

Some of the steps performed by an administrator/owner of a hybrid cloud are described in detail below. As the first step, the administrator sets up a DR environment and a hardware/software configuration in a first cloud (assumed to be cloud 230 for illustration). Such setup may entail configuring the On-Prem nodes/VMs to operate as a primary site and also nodes/VMs on a public cloud infrastructure to operate as a secondary site on which the On-Prem workload will failover during disaster recovery.

The administrator then defines a DR workload that is the set of nodes/VMs that are part of disaster recovery and accordingly have to be backed up from the primary site to the secondary site. In one embodiment described below, disaster recovery workload includes identifying the VMs and categorizing them into one or more categories such as HR, Finance, Engineering, IT, etc., and then configuring these categories with desired protection plans/policies (disaster recovery policies). Each protection plan/policy specifies the frequency of the snapshot cycles (RPO) like per minute/hour/day level. Each of these RPO (recovery point objectives) variations is associated with different pricing levels and accordingly the choice of the RPO for different categories is an important factor for metering and billing. The manner in which the administrator may specify categories and associated policies to the categories is described below with examples.

FIGS. 4A-4D depicts (sample) user interfaces used for specifying the setup of a disaster recovery service in a cloud in one embodiment. Display area 400 (of FIGS. 4A-4D) represents a portion of a user interface displayed on a display unit (not shown) associated with one of user systems 110. In one embodiment, display area 400 corresponds to a web page rendered by a browser executing on a user system. The web pages may be provided by testing server 150 in response to a user (such as a customer/tenant, administrator, etc.) sending appropriate requests (for example, by specifying corresponding Uniform Resource Locator (URL) in the address bar) using the browser.

Referring to FIG. 4A, display area 410 depicts a list of categories specified by an administrator. Each category is shown containing one or more VMs (resources) and associated protection/disaster recovery policies. For example, display area (rows) 415 indicates that the category "Ormed" is associated with 5 VMs and has been assigned 1 protection policy and 1 recovery action. Similarly, the other rows of the list specify the details of corresponding categories specified by the administrator. The administrator may select a desired category (such as 415) and may update the details of the category, as described in detail below.

Referring to FIG. 4B, display area 420 depicts the manner in which an administrator is facilitated to update a category (assumed to be "Ormed" of 415, for illustration). Display area 420 enables the administrator to add/remove VMs and also to add/remove protection policies associated with the VMs. Though not shown, a user interface similar to FIG. 4B may be provided for adding new categories.

Figure 4C:
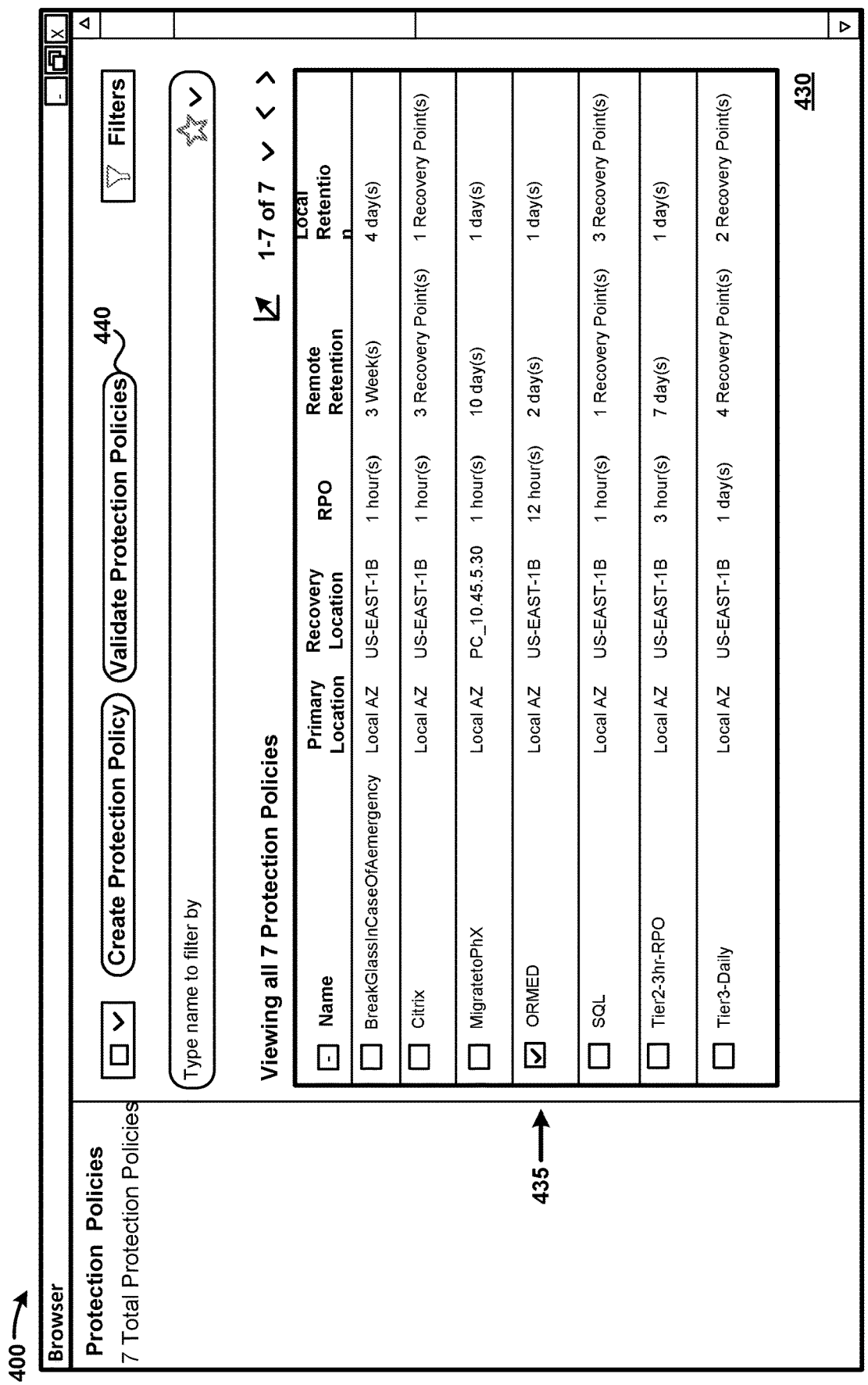

Referring to FIG. 4C, display area 430 depicts a list of protection policies specified by an administrator. Each protection policy is shown having a primary location, recovery (backup) location, a RPO (recovery point objective), a remote retention (period) and a local retention (period). For example, display area/row 435 specifies a protection policy named "ORMED" whose primary location is "Local AZ", recovery/backup location is "US-EAST-1B", RPO is "12 hours", remote retention is "2 day(s)" and local retention is "1 day(s)". Similarly, the other rows of the list specify the details of corresponding protection/disaster recovery policies specified by the administrator. The administrator may select a desired policy (such as 435) and may update the details of the policy, as described in detail below.

Referring to FIG. 4D, display area 450 depicts the manner in which an administrator is facilitated to update a protection policy (assumed to be "ORMED" of 435, for illustration). Display area 460 enables the administrator to add/change the RPO for the policy. The RPO is specified by first selecting a unit of duration ("minutes", "hours" or "days") and then specifying a period of activation (e.g., 12 shown there). Display area 460 thus indicates that the protection policy is to be activated every 12 hours.

Display area 470 indicates the pricing level (metering tier) corresponding to the user specified values in display area 460. Each pricing level/metering tier specifies a cost associated with one or more RPOs, typically specified as a range of RPO (e.g., greater than a lowest RPO and less than a highest RPO). In the description below, it is assumed that the disaster recovery service operates with 3 pricing levels/metering tiers—"Premium" when RPO is less than or equal to 4 hours, "Advanced" when RPO is greater than 4 hours but less than or equal to 1 day and "Basic" when RPO is greater than 1 day. Display area 470 is accordingly shown displaying "Advanced" corresponding to the RPO "12 hours" selected in display area 460. It may be appreciated that in alternative embodiments, different pricing levels/metering tiers may be provided by the DRS, with display area 470 then displaying the appropriate pricing level.

Display area 480 facilitates the administrator to associated various categories with the protection policy being updated (here "ORMED"). Display area 480 indicates that the protection policy "ORMED" is associated with the category "Ormed" thereby indicating that the VMs of the category "Ormed" are to be backed up every 12 hours. After making the desired changes, the administrator may click/select "Save" button 490 to cause the updated protection policy to be active.

Thus, display area 450 enables the administrator to update protection policies and also to add/remove categories associated with the protection policies. Though not shown, a user interface similar to FIG. 4D may be provided for adding new protection/disaster recovery policies.

During normal operation, DRaaS system 120 (or corresponding agents deployed in nodes of first cloud 230) causes backups/snapshots of the VMs (specified using the user interfaces of FIGS. 4A-4B) executing in cloud 230 to be created and sent to the secondary site for storage. The frequency of creation and storage of the snapshots is indicated by the RPO associated with the categories using the user interfaces of FIGS. 4C-4D. However, the administrator after specifying the desired categories, and protection policies and then associating the protection policies with the categories, may wish to validate whether the protection policies specified are being metered accurately.

Accordingly, the administrator may select the protection policies of interest (to be testing for accurate metering) and click/select "Validate Protection Policies" button 440 in FIG. 4C to cause a request to be sent to testing server 150 for validating the metering of the disaster recovery setup in cloud 230 (hereinafter "validation request"). The validation request includes the tenantID ("TE1"), details of the categories, VMs, etc. and also the selected protection policies as a first configuration of the DRS setup in cloud 230.

Testing server 150 then stores the received information in a non-volatile storage (not shown). The manner in which the information received as part of requests to validate metering of a DRS used in clouds is maintained is described below with examples.

7. Sample Data

FIG. 5A depicts portions of category data specifying details of cloud resources (VMs) deployed in a cloud in one embodiment. Though shown in the form of tables, the category data (and other data portions shown in FIGS. 5B, 8A-8C and 9A-9D) may be collected/maintained according to other data formats (such as extensible markup language (XML), etc.) and/or using other data structures (such as lists, trees, etc.), as will be apparent to one skilled in the relevant arts by reading the disclosure herein.

Table 500 depicts a portion of the category data maintained by testing server 150 for cloud 230 (as indicated by the tenant_ID "TE1"). The category data may be received as part of a validation request to validate metering of DRaaS 120 in first cloud 230, and specifies the details of the resources (VMs) deployed in the first cloud (230). In particular, column "Category" specifies the name of a category, "VM List" specifies the list of VMs (in the form of VM name<VM resource definition>) in the category. The column "VM Total" specifies the total amount of infrastructure resources (in the form of a resource definition) corresponding to the category, and is the sum of the all the VM resource definitions specified in "VM List".

Thus, row 511 indicates that the category named "Ormed" includes the VMs—VM1<2×, 4 GB, 70 GB>, VM2<1×, 2 GB, 150 GB> and VM3<4×, 8 GB, 200 GB>, and that the total amount of infrastructure resources for the category is <7×, 14 GB, 420 GB>. Similarly, the other rows specify the details of other categories received in the validation request. The categories specified in table 500 may be associated with protection/disaster recovery policies as described below with examples.

FIG. 5B depicts portions of policy data specifying details of disaster recovery policies setup in a cloud in one embodiment. Table 550 depicts portions of policy data maintained by testing server 150 for cloud 230 (as indicated by the tenant_ID "TE1"). In particular, column "Policy ID" specifies a unique identifier of a policy, column "Policy Name" specifies the name of the policy, column "Category" specifies the category for which the policy is applicable, column "RPO" specifies the RPO of the policy, columns "Start Date Time" and "End Date Time" respectively specifies the start date and time (in 24 hour format) from which the policy is in effect and the end date and time (in 24 hour format) until which the policy is in effect and column "Metering Tier" specifies the metering tier/pricing level of the policy.

The policy data may be received as part of a validation request to validate metering of DRaaS 120 in first cloud 230, and specifies the details of the protection/disaster recovery policies setup in the first cloud (230). The validation request is received when a user/administrator clicks/selects "Validate Protection Policies" button 440 in FIG. 4C. Some of the policy data may be received when a user updates/change a policy and/or changes categories associated with a policy, for example, upon a user clicking/selecting "Save" button 490 in FIG. 4D.

For illustration it is assumed that a user/administrator first setup two protection policies on 5 Nov. 2020, added two more protection policies on 18 Dec. 2020 and then clicked/selected the "Validate Protection Policies" button 440 in FIG. 4C. Rows 561-564 capture the details of the four protection policies specified by the user/administrator. On 28 Jan. 2021, the administrator removed the association of a first policy (P100) from the corresponding category, updated a second policy (P300) by changing only the RPO and added a third policy (P500). The removal of the association of the first policy is captured by the change in the end date time in row 561 to 28 Jan. 2021 (to indicate the end of policy P100). The update of second policy is captured by the change in the end date time in row 563 to 28 Jan. 2021 (to indicate the end of policy P300) and addition of a new row 565 capturing the details of the updated policy (P301). It may be observed that row 565 reflects the new RPO updated by the administrator. The addition of third policy (P500) is captured in row 566 of table 550.

Thus, testing server 150 (receives and) maintains the category data and policy data required for validating the metering of DRaaS 120 in first cloud 230. Though not shown, testing server 150 may similarly maintain data corresponding to other clouds (such as cloud 240) based on their tenant_IDs ("TE2" for cloud 240). Testing server 150 then prepares a test/second cloud for executing the DR workload similar to the first cloud, as described below with examples.

8. Test Cloud

Figure 6A:
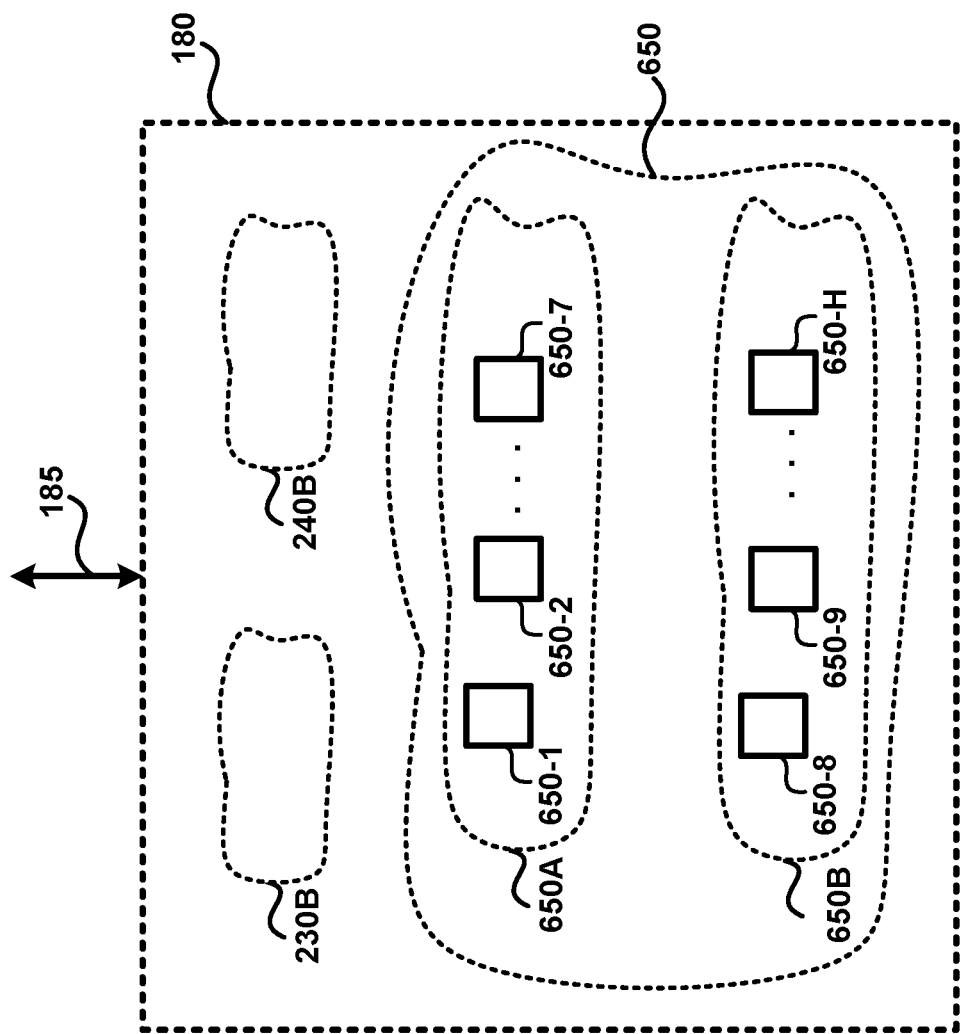
FIG. 6A illustrates the manner in which a test/second cloud is provisioned in a cloud infrastructure in one embodiment.

FIG. 6A illustrates the manner in which a test/second cloud is provisioned in a cloud infrastructure in one embodiment. Test cloud 650 represents a test/second cloud provisioned by testing server 150. Test cloud 650 is shown containing VMs 650-1 through 650-H (H representing any natural number) that may be provisioned on nodes 190 of cloud infrastructure 180. Groups 650A and 650B respectively represent the set of VMs contained in the primary site and secondary site in test cloud 650.

According to an aspect of the present disclosure, testing server 150 prepares and configures test cloud 650 in response to receiving the validation request noted above. Testing server 150 may accordingly provide/select one or more nodes 190 in cloud infrastructure 180, provision multiple VMs (650-1 through 650-H) in line with their corresponding resource definitions specified in table 500, and configure the disaster recovery service to operate according to the disaster recovery policies specified in table 550. In other words, the configuration of test cloud 650 is the same as the configuration of the first cloud 230 sought to be validated.

It may be appreciated that the first cloud 230 is a hybrid cloud in which the first primary site (230A) is hosted in a on-premises infrastructure (130) and the first secondary site (230B) is hosted in a first cloud infrastructure (180), while the test/second cloud 650 is a multi-cloud cloud comprising a second primary site (650A) and a second secondary site (650B), both being hosted in the second cloud infrastructure (180). It may be readily observed that test cloud 650 is separate and distinct from cloud (230) whose metering of the usage of DRS is sought to be validated.

Figure 6B:
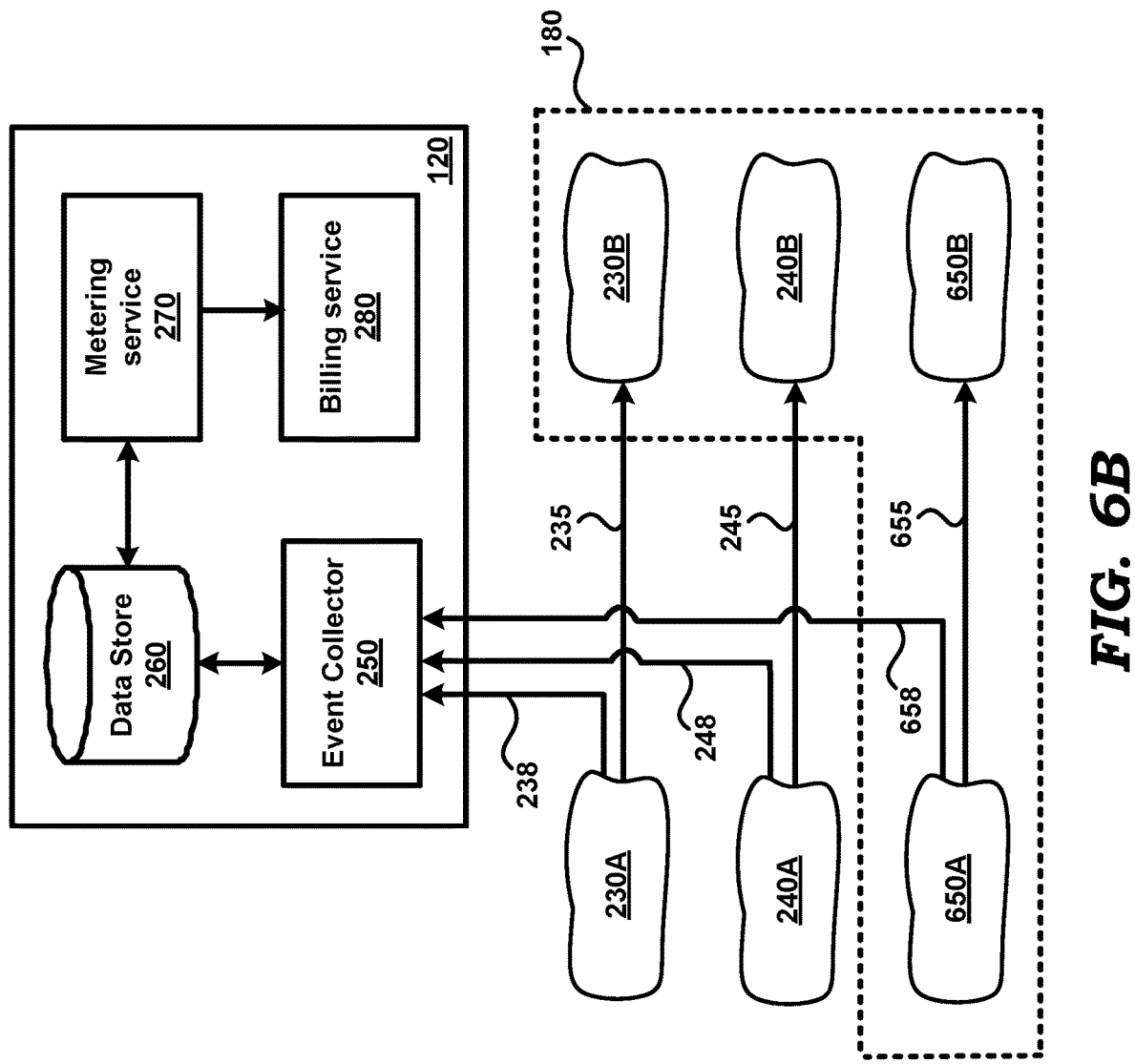
FIG. 6B illustrates the manner in which disaster recovery as a service is provided for test cloud in one embodiment.

FIG. 6B illustrates the manner in which disaster recovery as a service is provided for test cloud (650) in one embodiment. FIG. 6B contains blocks similar to those in FIG. 2C, and accordingly the description of the similar blocks is not repeated here for conciseness.

During normal operation, DRaaS 120 facilitates the backup/replication of data at various time instances from primary site 650A to secondary site 650B as indicated by arrow 655. Event collector 250 collects and stores information on the backups performed for test cloud 650 (as indicated by arrow 658), with metering service 270 then processing the collected information to determine the number/frequency of backups performed for test cloud 650.

Accordingly, testing server 150 periodically collects from metering service 270 of DRaaS system 120, measured values representing the actual usage of the DRS/DRaaS by test cloud 650 and then compares the measured values (metering consumption numbers) with corresponding reference values expected during the operation of the test cloud. Testing server 150 then sends a response to the validation request based on a result of the comparing.

As described later with respect to FIGS. 9D/9E, metering of DRaaS 120 for test cloud 650 is validated, as a basis for validating the metering of the usage of DRS in requested first cloud 230. It is accordingly helpful to understand the nature of metering of DRS usage in clouds. Accordingly, FIGS. 7 through 8E are used to establish the manner in which usage of DRS in clouds can be metered and billed in an embodiment.

9. Metering and Billing DRS Usage in Clouds

Figure 7:
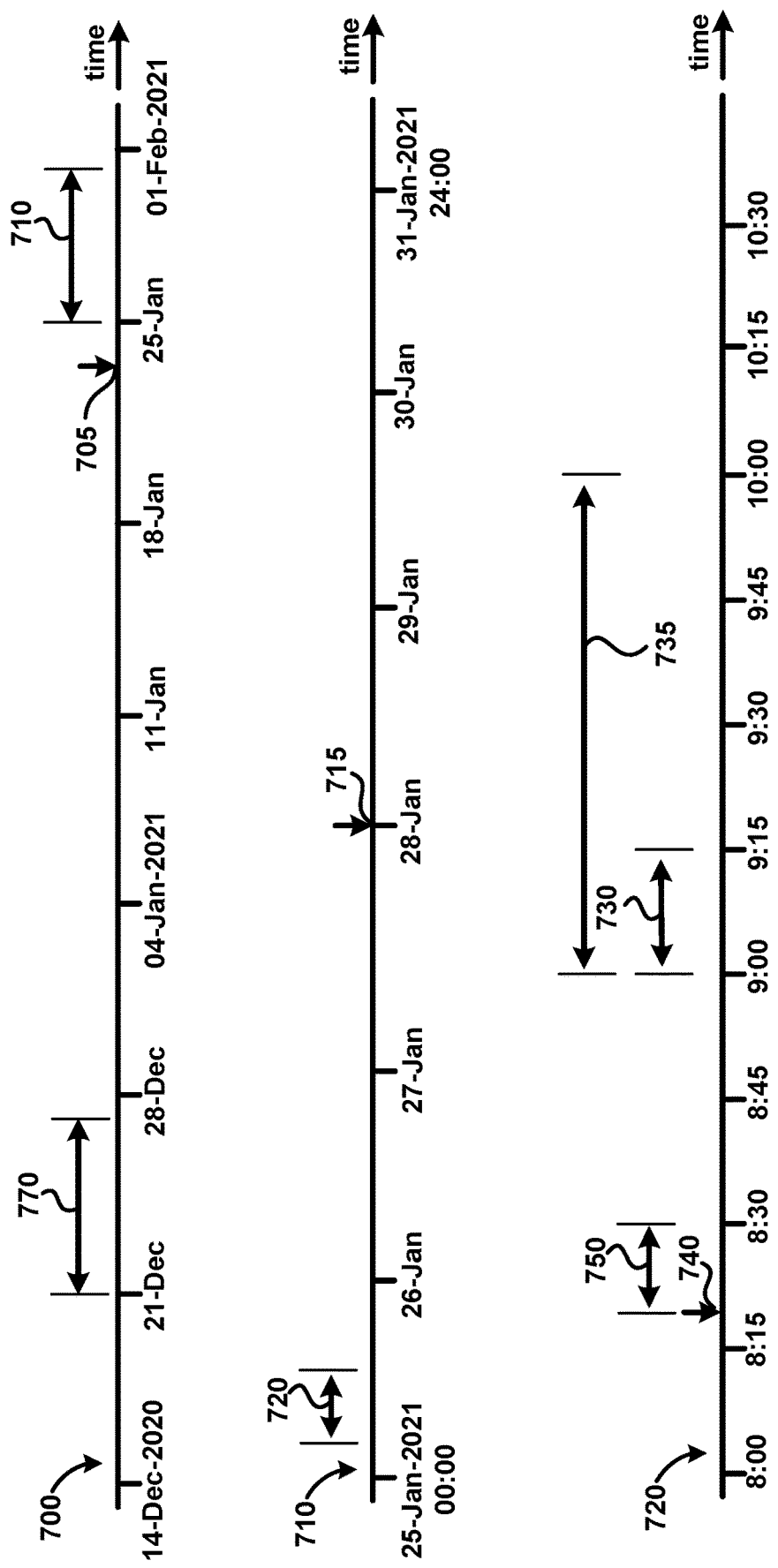
FIG. 7 is a timeline according to which the usage of a disaster recovery service in clouds is monitored in one embodiment.

FIG. 7 is a timeline (700) according to which the usage of a disaster recovery service in clouds is monitored in one embodiment. In particular, timeline 700 is shown in weeks, with the Monday of each week marked on the timeline (e.g., 14 Dec. 2020, 4 Jan. 2021, etc.). Time instance 705 represents the time at which the validation request (to validate the metering of usage of DRS in cloud 230) was received and is assumed to be 23 Jan. 2021. Time interval 710 (from 25 Jan. 2021 to 31 Jan. 2021) represents the time interval/duration during which testing server 150 collects the measured values from test cloud 650. Time interval 710 is shown in more detail as timeline 710 below timeline 700.

Timeline 710 is shown in days (e.g., 25 Jan. 2021, 26 Jan. 2021, etc.). Time instance 715 represents the time (28 Jan. 2021 16:45) at which testing server 150 receives an indication that the setup of the DRS in cloud 230 has been changed to operate according to a second configuration (different from the first configuration received along with the validation request). Time interval 720 represents a portion of timeline 710 which is shown in more detail as timeline 720 below timeline 710.

In the following description, it is assumed that event collector 250 collects DRS usage information from nodes 190 every 1 minute (collection interval), and accordingly timeline 720 is shown in minutes (with time instances "8:15", "8:30" etc. shown according to 24-hour format).

Time interval 730 represents a metering interval (assumed to be 15 minutes for illustration) according to which DRS usage is measured. Thus, metering service 270 measures DRS usage in a sequence of metering intervals such as 9:00-9:15, 9:15-9:30, 9:30-9:45, etc. It should be noted that the metering intervals are non-overlapping durations, with 9:00-9:15 representing the time instances in the duration 9:00:01 (:01 representing the seconds) to 9:15:00, and 9:15-9:30 representing the time instances in the duration 9:15:01 to 9:30:00. It may be further appreciated that the billing of the DRS usage may be performed at a more general level.

Time interval 735 represents a billing interval (assumed to be 1 hour for illustration) according to which DRS usage is billed for each cloud and/or tenant. Thus, billing service 280 bills customers/tenants based on the usage of DRS by their cloud in each billing interval such as 9:00-10:00 (more specifically 9:00:01 to 10:00:00), 10:00-11:00, 11:00-12:00, etc. Each billing interval (735) contains multiple (here 4) metering intervals.

According to an aspect of the present disclosure, when a request to validate metering of cloud 230 is received at a time instance, testing server 150 performs the collecting of measured values for corresponding durations starting from a next metering interval following the time instance such that each of the corresponding durations aligns with a respective metering interval of the sequence of metering intervals. In timeline 720, if the request is received at time instance 740 (e.g., 8:20), testing server 150 waits for duration 550 (10 minutes) and then starts the collecting of the measured values from metering server 270 at the next metering interval of 8:30-8:45.

The manner in which DRS usage information is collected and processed by testing server 150 with respect to timeline 700 is described below with examples.

10. Collecting DRS Usage Information

FIG. 8A depicts portions of DRS usage information collected for a cloud in one embodiment. Table 800 depicts a portion of the DRS usage information collected by event collector 250 from various nodes 190 in test cloud 650. Though event collector 250 collects the usage information every minute, for conciseness, only the relevant time instances at which at least one disaster recovery policy/protection policy has been activated is shown in table 800.

Column 801 indicates a corresponding time instance at which at least one policy has been activated, column 802 indicates the cloud (here "TE3" for all rows) in which the policy has been activated, and column 803 indicates the list of policies activates at that time instance. Thus, each of the rows of table 800 specifies the details of corresponding policies activated as part of DRS. It may be readily observed that policy P200 is shown activated every 15 minutes (rows 811, 812, 816, etc.) as per the RPO of P200. Similarly, policy P300 is shown activated every 1 hour (rows 812, 813, 818, etc.), policy P100 is shown activated every 12 hours (rows 814, 815, 817, etc.) and policy P400 is shown activated every day (rows 815, 821, 823, etc.). Policies P301 and P500 are shown activated only after 28 Jan. 2021, after receiving the indication of change in configuration at time instance 715.

Rows 819 and 820 indicate that policy P300 was activated at the corresponding time instances 28 Jan. 2021 17:00 and 28 Jan. 2021 18:00, though the end date time of policy P300 is 28 Jan. 2021 16:45 (as per row 563 in policy data 550 of FIG. 5B). Furthermore, rows 816A and 816B corresponding to activation of policy P200 at time instances 27 Jan. 2021 10:15 and 27 Jan. 2021 11:00 indicate that policy P200 was not activated at time instances 27 Jan. 2021 10:30 and 27 Jan. 2021 10:45 as per the RPO of P200. Rows 822 and 823 indicate the last two time instances in time interval 710 at which the DRS usage information was collected by event collector 250.

Thus, event collector 250 collects the DRS usage information from nodes 190 hosting test cloud 650. Metering service 270 measures the resources used by test cloud 650 based on the collected usage information (table 800) as described in detail below.

11. Metering DRS Usage

FIG. 8B depicts the manner in which the DRS usage in a cloud is metered in one embodiment. In particular, table 830 depicts the manner in which the DRS usage in test cloud 650 (as indicated by the tenant_ID "TE3") is metered by metering service 270. The various disaster recovery policies applicable in test cloud 650 is shown as corresponding columns in table 830 and are the same policies specified in table 550 for first cloud 230. The dates in time interval 710 are shown as rows in table 830.

Thus, each cell at the intersection of a column/policy and a row/date indicates the number of times the corresponding policy has been activated in the corresponding date. The values for the cells of table 830 is obtained based on the information in table 800, where the value for a cell is determined by determining the number of times the corresponding policy is present in the DRS usage information of table 800 for the corresponding day. For example, for day 25 Jan. 2021 and policy P100, the value in the cell is shown as 2 corresponding to the activation of policy P100 in rows 814 and 815 of table 800. The values for the other cells of table 830 may similarly be calculated based on the information in table 800.

Row 841 depicts number of times each policy has been on day 25 Jan. 2021. In one embodiment, metering service 270 also captures the amount of infrastructure resources that were backed up as part of backing up the cloud resources (VMs). In one embodiment, the infrastructure resources are "vcpu"—the number of (virtual) CPU cycles (e.g., 1×, 2×, 4×), "memory"—the amount of memory (RAM) in gigabytes (e.g., 1 GB, 2 GB, 4 GB) and "storage"—the amount of persistent storage in gigabytes (e.g., 50 GB, 100 GB, 200 GB). Alternative embodiments may have more or less infrastructure resources as will be apparent to one skilled in the relevant arts.

Thus, rows 842-844 (shown as sub-rows of row 841) depicts the numbers corresponding to vcpu, memory and storage captured for different polices on 25 Jan. 2021. Similarly, the sub-rows of other rows capture the amount infrastructure resources that were backed up on the corresponding other days.

It may be observed that row 845 indicates that policy P200 has been activated only 94 times (in view of absence of rows between 816A and 816B in table 800) and row 846 indicates that policy P300 has been invoked 18 times (in view of rows 819 and 820 in table 800). Row 843 indicates the total number of times a policy was invoked in time interval 710 (25 Jan. 2021 to 31 Jan. 2021).

Thus, metering service 270 measures the DRS usage in test cloud 650. In one embodiment, metering service 270 collates the DRS usage based on metering tiers, as described below with examples.

FIG. 8C depicts the manner in which the DRS usage in a cloud is collated based on metering tiers in one embodiment. In particular, table 850 depicts the manner in which the DRS usage in test cloud 650 (as indicated by the tenant_ID "TE3") is collated based on metering tiers by metering service 270. The dates in time interval 710 are shown as columns in table 850, while the metering tiers/pricing levels are shown as rows 861, 862 and 866 in table 850. Column 851 depicts the totals for the time interval 710.

Each cell at the intersection of a column/date and a row/billing tier in rows 861, 862 and 866 indicates the number of times a policy falling in the corresponding metering tier has been activated in the corresponding date. The values in rows 861, 862 and 866 for the cells of table 850 is obtained based on the information in table 830, where the value for a cell is determined by adding all the values in table 830 for policies falling in the corresponding metering tier for the corresponding day. For example, for day 25 Jan. 2021 and metering tier "Advanced", the value in the cell is shown as 3 which is the sum of the values (2, 0, 1) for P100, P301 and P400 (falling in the metering tier "Advanced") for the day 25 Jan. 2021. Similarly, the values in rows 866 ("Premium") is obtained by adding the values for P200, P300 and P500 in table 830 for the corresponding day. The values in row 861 is shown as 0 since there are no policies that fall in the metering tier "Basic" in table 830.

Rows 863-865 (shown as sub-rows of row 862) specify the details of the infrastructure resources backed up as part of backing up of the cloud resources (VMs). The values in each of sub-rows (e.g., 863 for "vcpu") is determined by adding all the values in table 830 for the infrastructure resource ("vcpu") metered for all the policies (P100, P301 and P400) falling in the corresponding metering tier ("Advanced") for the corresponding day. Similarly, the values in rows 867-869 are determined based on the infrastructure resources metered for the policies P200, P300 and P500 falling in the metering tier "Premium".

It may be appreciated that such collation may be required to handle various billing scenarios. For example, in the above noted embodiment, it is assumed that each instance of activation of a policy is to be billed, and accordingly collation is merely performed based on metering tiers. However, in an alternative embodiment, billing may be performed based the whether a policy/metering tier is activated or not in each billing interval (1 hour), irrespective of the actual number of times the policy/metering tier is activated in the billing interval. Thus, for the metering tier "Premium" on day "25 Jan. 2028" the total number of activations to be billed would be 48 (24 times P200+24 times P300) instead of 120 (96 times P200+24 times P300). The other values in table 850 may similarly be collated to reflect the alternative billing scenario.

Metering service 270 then forwards the portions of table 830 and table 850 to billing service 280, which in turn computes and bills the customers/tenants based on the metering of their DRS usage. The manner in which billing service 280 bills customers/tenants is described below with examples.

12. Billing DRS Usage

Billing server 280 receives the information of tables 830 and 850 and computes the billing of the customer/tenant. In one embodiment, the totals in the last column 851 of table 850 may be multiplied by appropriate prices to arrive at the billing to be done to the customer/tenant for the DRS usage in time interval 710 (25 Jan. 2021 to 31 Jan. 2021).

FIG. 8D depicts a rate card according to which a customer/tenant is billed in one embodiment. In particular, table 870 depicts the rate card (prices) for test cloud 650 (as indicated by the tenant_ID "TE3"). The metering tiers ("Basic", "Advanced", "Premium") are shown as rows in table 870, while the infrastructure resources (vcpu, memory, storage) are shown as columns in table 870. Each cell at the intersection of a row/metering tier and a column/infrastructure resource indicates the price for the infrastructure resource (per x, per GB, etc.) used by the corresponding metering tier.

It may be appreciated that the prices shown in rate card of table 870 are typically in terms of a monetary unit/currency (e.g., US Dollars). However, for conciseness, the prices in table 870 (and also in the other tables depicting prices described below), the monetary unit/currency is not shown in the drawings. In one embodiment, the rate card of table 870 is the same as the rate card of the requesting tenant ("TE1").

FIG. 8E depicts the manner in which the DRS usage in a cloud is billed in one embodiment. In particular, table 880 depicts the manner in which the DRS usage in test cloud 650 (as indicated by the tenant_ID "TE3") is billed by billing service 280. The metering tiers ("Basic", "Advanced", "Premium") are shown as rows in table 880, while the infrastructure resources (vcpu, memory, storage) are shown as columns in table 880.

Each cell at the intersection of a row/metering tier and a column/infrastructure resource indicates the total price for the infrastructure resource used by the corresponding metering tier in time interval 710 (25 Jan. 2021 to 31 Jan. 2021). The value in each cell of rows 891-893 is computed by multiplying the totals in the last column 851 of table 850 with the corresponding rate/price specified in the rate card of table 870. For example, the value "204.60" for "vcpu" for "Advanced" metering tier is computed by multiplying the total for "Advanced vcpu" in column 851 (that is, 93x) with the rate/price for the combination of "Advanced" and "vcpu" in table 870 (that is, 2.2).

Each of the rows between rows 894 and 895 (shown as sub-rows of row 893) indicate the total price for the infrastructure resource used by the corresponding metering tier in a corresponding day ("25 Jan. 2021", "26 Jan. 2021", etc.) in time interval 710. The values of the sub-rows are also computed similar to the computation of rows 891-893. Row 896 specifies the total price to be billed to the customer/tenant for each of the infrastructure resources and is determined by adding the values in rows 891-893.

Thus, the DRS usage of different clouds (230, 240, etc.) is metered and billed to the corresponding owners/tenants. As noted above, customer/tenant (TE1) may wish to validate whether the metering (and in turn, the billing) of the DRS usage of their cloud 230 is accurate.

In response to a request to validate metering of DRS usage in (a first) cloud 230, testing server 150 provisions test cloud 650 similar to the first cloud (table 500 of FIG. 5A) and configures the test cloud to operate with the same disaster recovery policies/protection policies (table 550 of FIG. 5B) as that of the first cloud 230.

Testing server 150 then retrieves the collected DRS usage information of FIG. 8A by interfacing with event collector 250. Testing server 150 then builds the metering table of FIG. 8B and the collated table of FIG. 8C based on the retrieved/collected DRS usage information. Testing server 150 also computes the billing table of FIG. 8E based on the rate card of FIG. 8D. It should be appreciated that as test cloud 650 is the same as the first cloud 230, the information of FIGS. 8A, 8B, 8C and 8E reflect the manner in which the customer/tenant of first cloud 230 would be metered and billed for the time interval 710.

Testing server 150 then determines expected values representing expected usage of the DRS in test cloud 650 and then compares the expected values with the measured values to determine the accuracy of metering service 270. The manner in which testing server 150 determines the expected values with the corresponding measured values is described below with examples.

13. Determining Expected Values

FIG. 9A depicts portions of expected (metering) values representing expected usage of DRS in a cloud in one embodiment. In particular, table 900 depicts portions of the expected values representing the expected usage of DRaaS 120 in test cloud 650 (as indicated by the tenant_ID "TE3").

Table 900 is similar to table 830 of FIG. 8B and shows the disaster recovery policies applicable in test cloud 650 as corresponding columns and dates in time interval 710 as corresponding rows. Each cell in table 900 at the intersection of a column/policy and a row/date indicates the number of times the corresponding policy is expected to be activated in the corresponding date. For example, for day 25 Jan. 2021 and policy P100, the value in the cell is shown as 2 indicating that policy P100 is expected to be activated 2 times on day 25 Jan. 2021.

It may be observed that row 911 indicates that policy P200 is expected to be activated 96 times and row 912 indicates that policy P300 is expected to be invoked 16 times. Row 913 indicates the total number of times a policy is expected to be invoked in time interval 710 (25 Jan. 2021 to 31 Jan. 2021).

The values in the cells of table 900 may be calculated using the below:

$$\begin{aligned}
&EV(p, d) = \\
&\quad \text{when } p \text{ is type day:} \\
&\quad\quad \text{if DateDiff}(d, \text{StartDate}(p)) \text{ modulo RPO}(p) = 0 \text{ then } 1 \text{ else } 0 \\
&\quad \text{when } p \text{ is type hours:} \\
&\quad\quad \text{ceil}((\text{EndHour}(p, d)\text{-StartElour}(p, d))/\text{RPO}(p)) \\
&\quad \text{when } p \text{ is type minutes:} \\
&\quad\quad (\text{EndHour}(p, d)\text{-StartHour}(p, d))*\text{ceil}(60/\text{RPO}(p))
\end{aligned}$$

Where, $EV(p, d)$ is the expected value for activation of a policy p on day d;

DateDiff calculates the difference between two dates provided as parameters;

StartDate(p) is the start date of the policy p (based on column "Start Date Time" in table 550 of FIG. 5B);

StartHour(p, d) is the start hour of the policy p on day d in 24-hour format (based on column "Start Date Time" in table 550 of FIG. 5B);

EndHour(p, d) is the end hour of the policy p on day d in 24-hour format (based on column "End Date Time" in table 550 of FIG. 5B);

RPO(p) is the RPO of policy p (as specified in column "RPO" in table 550 of FIG. 5B);

modulo and ceil are mathematical functions.

Some example computations are shown below:

$EV(\text{``P300''}, \text{``25-Jan-2021''})$ $= \text{ceil}((EndHour(\text{``P300''}, \text{``25-Jan-2021''})\text{-}StartHour(\text{``P300''},$
$\text{``25-Jan-2021''}))/RPO(\text{``P300''}))$ $= \text{ceil}((24\text{-}0)/1)$ $= 24$ $EV(\text{``P200''}, \text{``26-Jan-2021''})$ $= (EndHour(\text{``P200''}, \text{``26-Jan-2021''})\text{-}StartHour(\text{``P200''},$
$\text{``26-Jan-2021''})) * \text{ceil}(60/RPO(\text{``P200''}))$ $= (24\text{-}0) * \text{ceil}(60/15)$ $= 96$ $EV(\text{``P500''}, \text{``28-Jan-2021''})$ $= \text{ceil}((EndHour(\text{``P500''}, \text{``28-Jan-2021''})\text{-}StartHour(\text{``P500''},$
$\text{``28-Jan-2021''}))/RPO(\text{``P500''}))$ $= \text{ceil}((24\text{-}17)/3)$ $= 3$ Similarly, the expected values for each combination of policy and day may be calculated and table 900 generated by testing server 150. The values in the sub-rows of each row correspond to infrastructure resources and may also be compute based on the expected values calculated for a policy and day and the definition of the VMs backed up as part of the policy. For example, the value ("384×") in a sub-row (e.g., vcpu) for a policy (e.g., P200) is calculated as the product of the total amount of infrastructure resource (here, 4× for "vcpu") defined for the VMs in the category ("Tier1-Minute") for the policy (values in column "VM Total" of table 500 of FIG. 5A) and the number of times the policy is expected to be activated on that day, that is, EV(policy, day) (here, EV("P200", "25 Jan. 2021")=96).

According to an aspect of the present disclosure, testing server 150 determines the expected values of table 900 as being prior values representing actual usage of the DRS in the first cloud 230 in a past duration when the first cloud 230 was operating based on the first configuration. Testing server 150 also collects the measured values for a first duration after receipt of the validation request, the first duration equaling the past duration.

For example, in timeline 700, the past duration may be time interval 770 (21 Dec. 2020 to 27 Dec. 2020) during which cloud 230 was operating based on the policy data of FIG. 5B. The measured values are collected for time interval 710 having the same duration (7 days) as that of the past time interval 770. Accordingly, testing server 150 retrieves/collects from event collector 250 the DRS usage information for cloud 230 for time interval 770.

FIG. 9B depicts portions of DRS usage information collected for a cloud in one embodiment. In particular, table 920 depicts a portion of the DRS usage information collected by event collector 250 (in turn by testing server 150) from various nodes 140/190 in cloud 230. Similar to FIG. 8A, table 920 depicts only the relevant time instances at which at least one disaster recovery policy/protection policy has been activated. It may be observed that column 921 indicates corresponding time instances in the time interval 770 (instead of time interval 710 in table 800), and column 922 indicates that the cloud for which the policies have been activated is cloud 230 ("TE1" for all rows).

It may be appreciated that rows 932 and 933 indicate that policy P300 was not activated (as expected) in view of its end date time as noted above. Furthermore, the rows from 931A and 931B indicate that policy P200 was activated as per the as per the RPO of P200 (as expected).

After retrieving the usage information of table 920, testing server 150 determines the metering of cloud 230 for time interval 770 based on the usage information. The determination may be performed similar to the determination of metering table 830 from the usage information of table 800 as noted above, and accordingly the description is not repeated here for conciseness. Testing server 150 may then populate the expected values of table 900 from the metering table determined based on the DRS usage information of table 920 for cloud 230 in time interval 770.

According to an aspect of the present disclosure, when the first configuration is received along with the (validation) request, testing server 150 examines prior configurations setup for the DRS in the first cloud (230) to identify a prior duration having a corresponding prior configuration matching the first configuration, as the past duration. For example, testing server 150 may review the various prior durations (e.g., 14 Dec. 2020 to 20 Dec. 2020, 21 Dec. 2020 to 27 Dec. 2020, 11 Jan. 2021 to 17 Jan. 2021, etc.) prior to time interval 710 and then identify that time interval 770 is the prior duration having a prior configuration matching the first configuration (table 550 of FIG. 5B).

In one embodiment when test cloud 650 is operating along with first cloud 230, testing server 150, prior to deployment/preparing of test cloud 650, first fetches the metering and billing consumption numbers for the customer (using tenant_ID "TE1") for a past metering/billing cycle and stores the fetched numbers in a persistent storage (e.g., database). Testing server 150 then builds the expected values for the DR/test workload taking into consideration existing metering/billing numbers and all the RPOs (Recovery Point Objective) sought to be validated like minute, hour, day, etc. The expected values are stored the persistent storage.

After execution of the test workload (that is after performance of the backups according to the configuration of test cloud 650), testing server 150 collects the measured values representing the actual usage of the DRS/DRaaS by test cloud 650 and then compares the measured values with the expected values retrieved from the persistent storage. A match of the metered values with the expected values indicates that the metering (and by extension the billing) service of the disaster recovery service is working perfectly, and accordingly the metering of the usage of the DRS is accurate.

According to another aspect of the present disclosure, testing server 150 selects the past duration and identifies a prior configuration applicable to the selected past duration as the first configuration. For example, assuming that the validation request received by testing server 150 does not include the policy data of table 550 of FIG. 5B, testing server 150 may select a past duration (time interval 770) and then identify the prior configuration specified for the past duration as the configuration to be used in test cloud 650.

After determining the expected (metering) values of table 900, testing server 150 collates the metered values based on metering tiers. The collation may be performed similar to the collation of collated table 850 from metering table 830 as noted above, and accordingly the description is not repeated here for conciseness.

FIG. 9C depicts the manner in which expected values for a cloud is collated based on metering tiers in one embodiment. In particular, table 950 depicts the manner in which the DRS usage in test cloud 650 (as indicated by the tenant_ID "TE3") is collated based on metering tiers by metering service 270. The dates in time interval 710 are shown as columns in table 950, while the metering tiers/pricing levels and infrastructure resources are shown respectively as rows/sub-rows in table 950. Column 951 depicts the totals for the time interval 710.

After determining the expected metering/collated values, testing server 150 compares the expected values with the measured values to determine the accuracy of metering service 270. The manner in which such comparison may be performed is described below with examples.

14. Comparing Measured and Expected Values

FIG. 9D depicts the manner in which expected values are compared with measured values to validate metering of usage of DRS in a cloud in one embodiment. Table 960 depicts the comparison of the measured metered values (column 961) and expected metered values (column 962). The values in column 961 correspond to the total metered values in "Total" column 851 in table 850, while the values in column 962 correspond to the total expected values in "Total" column 951 in table 950.

Testing server 150 compares the measured values in column 961 with the corresponding expected values in column 962 to determine whether metering service 270 is accurate. In one embodiment, metering service 270 is determined to be accurate only if the measured values in column 961 match the expected values in column 962 for corresponding metering tiers. As noted above, a match may be determined even if the measured value differs from the expected value by an acceptable margin of error (e.g., ±2% of the expected value).

Rows 971 and 972 indicate that there is no difference between the measured and expected values for the "Basic" and "Advanced" billing tiers. Row 973 indicates that there is a match between the measured and expected values for "Premium" billing tier. However, the values for the usage of the infrastructures (rows 974-976) indicate that there may potentially be an issue with the "Premier" billing tier.

In one embodiment, metering service 270 is determined to be accurate only if the measured values match the expected values for all billing tiers (and also corresponding infrastructure usage), that is all the rows in table 960. In alternative embodiments, the metering service may be determined to be accurate based on the match of measured value and expected values for only a subset of billing tiers (e.g., only "Advanced" billing tier).

It may be appreciated that in the above embodiment, the validation of the metering service is performed based on comparison of the expected and measured metering values. However, in alternative embodiments, the validation may be performed based on the billing values and/or any other formula applied on the metering and/or billing values as will be apparent to one skilled in the relevant arts by reading the disclosure herein.

FIG. 9E depicts the manner in which expected values are compared with measured values to validate billing of usage of DRS in a cloud in one embodiment. Table 980 depicts the comparison of the measured and expected billed values for different infrastructure resources (columns 981-983). The values in the "Measured" sub-column in each of columns 981-983 correspond to the billed values in corresponding infrastructure columns in table 880 of FIG. 8E, while the values in the "Expected" sub-column in each of columns 981-983 is computed by multiplying the totals in the last column 951 of table 950 in FIG. 9C with the corresponding rate/price specified in the rate card of table 870 in FIG. 8D.

It may be observed that rows 991 and 992 indicate that there is no difference between the measured and expected billing values for the "Basic" and "Advanced" billing tiers, while row 993 indicates that there is a mismatch (no match) between the measured and expected billing values for "Premium" billing tier. Rows 994-995 (sub-rows of row 993) indicate the specific dates where there is a mismatch in the billing values, while row 996 indicates a mismatch in the total billing values (between the measured totals and the expected totals).

Thus, testing server 150, provided according to several aspects of the present disclosure, validates metering of usage of DRS in a cloud at least to ensure that the measurements captured by the metering service for the cloud/tenant are accurate.

It should be appreciated that the features described above can be implemented in various embodiments as a desired combination of one or more of hardware, software, and firmware. The description is continued with respect to an embodiment in which various features are operative when the software instructions described above are executed.

15. Digital Processing System

Figure 10:
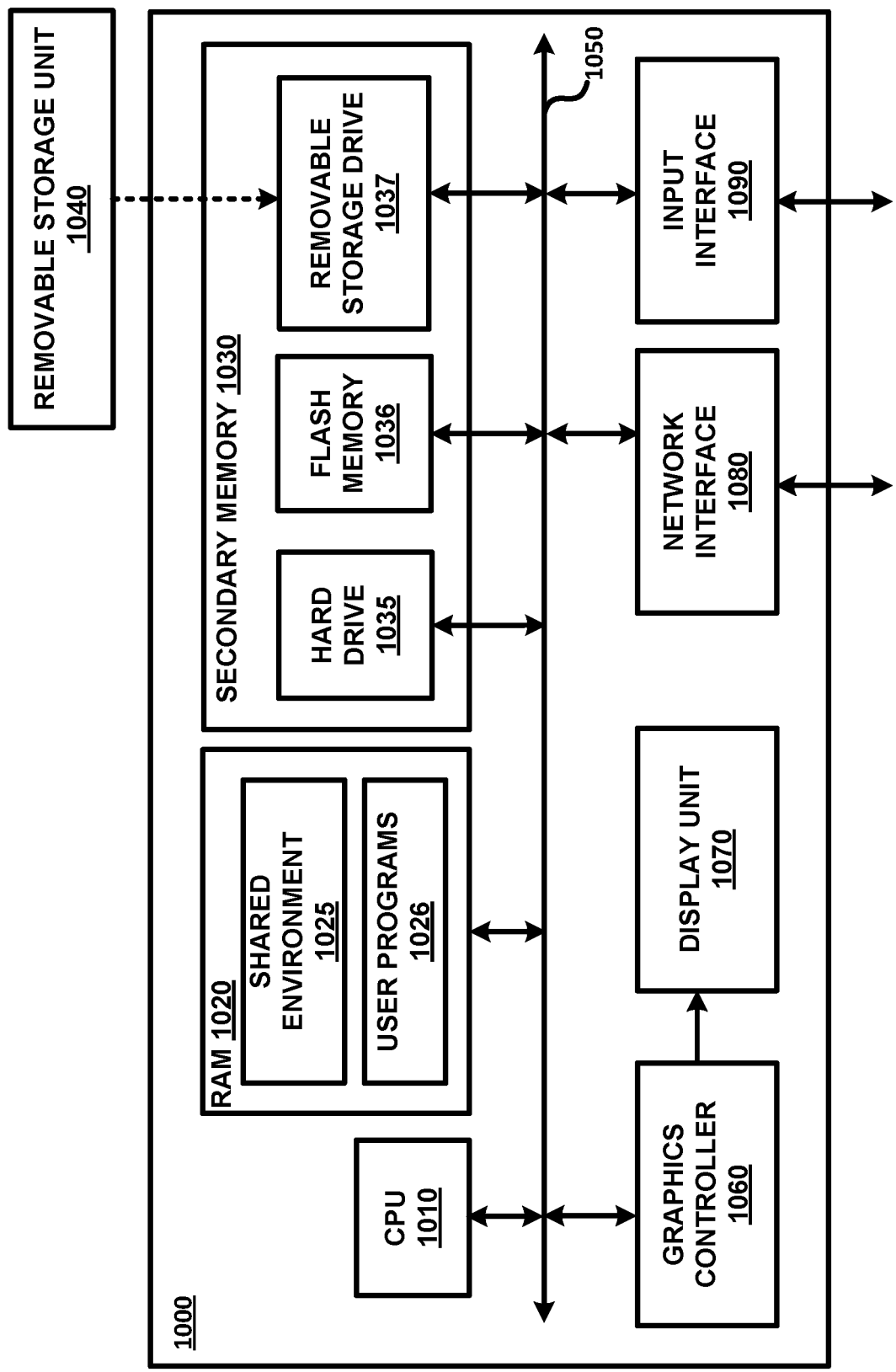
FIG. 10 is a block diagram illustrating the details of digital processing system in which various aspects of the present disclosure are operative by execution of appropriate executable modules.

FIG. 10 is a block diagram illustrating the details of digital processing system 1000 in which various aspects of the present disclosure are operative by execution of appropriate executable modules. Digital processing system 1000 may correspond to testing server 150.

Digital processing system 1000 may contain one or more processors such as a central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present disclosure. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions constituting shared environment 1025 and/or other user programs 1026 (such as other applications, DBMS, etc.). In addition to shared environment 1025, RAM 1020 may contain other software programs such as device drivers, virtual machines, etc., which provide a (common) run time environment for execution of other/user programs.

Graphics controller 1060 generates display signals (e.g., in RGB format) to display unit 1070 based on data/instructions received from CPU 1010. Display unit 1070 contains a display screen to display the images defined by the display signals (for example, portions of the user interface shown in FIGS. 4A-4D). Input interface 1090 may correspond to a keyboard and a pointing device (e.g., touch-pad, mouse) and may be used to provide inputs (for example, in the portions of the user interface shown in FIGS. 4A-4D). Network interface 1080 provides connectivity to a network (e.g., using Internet Protocol), and may be used to communicate with other systems (of FIG. 1) connected to the networks (120).

Secondary memory 1030 may contain hard drive 1035, flash memory 1036, and removable storage drive 1037. Secondary memory 1030 may store the data (for example, data portions shown in FIGS. 5A-5B, 8A-8C and 9A-9D) and software instructions (for example, for implementing the various features of the present disclosure as shown in FIG. 3, etc.), which enable digital processing system 1000 to provide several features in accordance with the present disclosure. The code/instructions stored in secondary memory 1030 may either be copied to RAM 1020 prior to execution by CPU 1010 for higher execution speeds, or may be directly executed by CPU 1010.

Some or all of the data and instructions may be provided on removable storage unit 1040, and the data and instructions may be read and provided by removable storage drive 1037 to CPU 1010. Removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1040 or hard disk installed in hard drive 1035. These computer program products are means for providing software to digital processing system 1000. CPU 1010 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1030. Volatile media includes dynamic memory, such as RAM 1020. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1050. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

16. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A non-transitory machine-readable medium storing one or more sequences of instructions, wherein execution of the one or more sequences of instructions by one or more processors contained in a digital processing system causes the digital processing system to perform actions of:

receiving a request to validate metering of usage of a disaster recovery service (DRS) in a first cloud, wherein the DRS in the first cloud is set up to operate according to a first configuration specifying respective disaster recovery policies applicable to corresponding cloud resources in the first cloud;

collecting from a metering service of the DRS, measured values representing an usage of the DRS in a second cloud, wherein the DRS in the second cloud is also set up with the disaster recovery policies specified in the first configuration, wherein the usage of the DRS in a cloud comprises backing up of cloud resources hosted in a primary site of the cloud to a secondary site according to a set of disaster recovery policies;

comparing the measured values with corresponding expected values representing expected usage of the DRS in the second cloud, wherein the expected values correspond to prior values representing actual usage of the DRS in the first cloud in a past duration when the first cloud was operating based on the first configuration, wherein the measured values correspond to a first duration after receipt of the request, wherein the first duration equals the past duration; and sending a response to the request based on a result of the comparing.

2. The non-transitory machine readable medium of claim 1, wherein the first configuration is received along with the request, further comprising one or more instructions for:

examining prior configurations set up for the DRS in the first cloud to identify a prior duration having a corresponding prior configuration matching the first configuration, as the past duration.

3. The non-transitory machine-readable medium of claim 2, further comprising one or more instructions for:
providing a user interface to enable a user to specify a first set of disaster recovery policies and submit the first set of disaster recovery policies as the first configuration of the first cloud,
wherein the request and the first configuration are received in response to the submit by the user using the user interface.

4. The non-transitory machine readable medium of claim 1, further comprising one or more instructions for:
selecting the past duration and identifying a prior configuration applicable to the selected past duration as the first configuration.

5. The non-transitory machine readable medium of claim 1, wherein the first cloud is provided based on a first cloud infrastructure, further comprising one or more instructions for:
in response to the request, preparing the second cloud in a second cloud infrastructure and configuring the DRS in the second cloud according to the first configuration.

6. The non-transitory machine-readable medium of claim 5, wherein the first cloud comprises a first primary site and a first secondary site, wherein the DRS in the first cloud is set up to backup the corresponding cloud resources from the first primary site to the first secondary site according to the first configuration.

7. The non-transitory machine-readable medium of claim 6, wherein the corresponding cloud resources comprise virtual machines provisioned as part of the first cloud.

8. The non-transitory machine-readable medium of claim 6, wherein the first cloud is a hybrid cloud in which the first primary site is hosted in a on-premises infrastructure and the first secondary site is hosted in the first cloud infrastructure,
wherein the second cloud is a multi-cloud cloud comprising a second primary site and a second secondary site, both being hosted in the second cloud infrastructure.

9. The non-transitory machine-readable medium of claim 1, wherein the collecting is performed from a first time instance to a second time instance, wherein the first time instance is after receipt of the request, further comprising one or more instructions for:
receiving at a third time instance an indication that the DRS in the first cloud has been changed to operate according to a second configuration, wherein the third time instance is between the first time instance and the second time instance;
modifying the second cloud to also operate according to the second configuration; and
continuing to collect the measured values from the modified second cloud in a duration between the third time instance and the second time instance.

10. The non-transitory machine-readable medium of claim 1, wherein the request is received from a tenant owning the first cloud.

11. A digital processing system comprising:
a random access memory (RAM) to store instructions; and
one or more processors to retrieve and execute said instructions, wherein execution of said instructions causes said digital processing system to perform actions of:
receiving a request to validate metering of usage of a disaster recovery service (DRS) in a first cloud, wherein the DRS in the first cloud is set up to operate according to a first configuration specifying respective disaster recovery policies applicable to corresponding cloud resources in the first cloud;
collecting from a metering service of the DRS, measured values representing an usage of the DRS in a second cloud, wherein the DRS in the second cloud is also set up with the disaster recovery policies specified in the first configuration,
wherein the usage of the DRS in a cloud comprises backing up of cloud resources hosted in a primary site of the cloud to a secondary site according to a set of disaster recovery policies;
comparing the measured values with corresponding expected values representing expected usage of the DRS in the second cloud, wherein the expected values correspond to prior values representing actual usage of the DRS in the first cloud in a past duration when the first cloud was operating based on the first configuration, wherein the measured values correspond to a first duration after receipt of the request, wherein the first duration equals the past duration; and
sending a response to the request based on a result of the comparing.

12. The digital processing system of claim 11, wherein the first configuration is received along with the request, further performing the actions of:
examining prior configurations set up for the DRS in the first cloud to identify a prior duration having a corresponding prior configuration matching the first configuration, as the past duration.

13. The digital processing system of claim 11, further performing the actions of:
selecting the past duration and identifying a prior configuration applicable to the selected past duration as the first configuration.

14. The digital processing system of claim 11, wherein the first cloud is provided based on a first cloud infrastructure, further performing the actions of:
in response to the request, preparing the second cloud in a second cloud infrastructure and configuring the DRS in the second cloud according to the first configuration.

\* \* \* \* \*